(12) United States Patent
Hirose et al.

(10) Patent No.: US 7,075,404 B2
(45) Date of Patent: Jul. 11, 2006

(54) PORCELAIN COMPOSITION FOR VARISTOR AND VARISTOR

(75) Inventors: Sakyo Hirose, Shiga-ken (JP); Akinori Nakayama, Otsu (JP); Kousuke Shiratsuyu, Omihachiman (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 10/496,607

(22) PCT Filed: Aug. 13, 2003

(86) PCT No.: PCT/JP03/10280

§ 371 (c)(1),
(2), (4) Date: May 19, 2004

(87) PCT Pub. No.: WO2004/019350

PCT Pub. Date: Mar. 4, 2004

(65) Prior Publication Data
US 2005/0143262 A1    Jun. 30, 2005

(30) Foreign Application Priority Data
Aug. 20, 2002  (JP)  .............. 2002-239663
Jul. 18, 2003  (JP)  .............. 2003-199401

(51) Int. Cl.
*H01C 7/10*    (2006.01)

(52) U.S. Cl. ....................... 338/21; 338/223

(58) Field of Classification Search .............. 338/20, 338/21, 13, 225 D, 52, 54, 83, 223, 224
See application file for complete search history.

(56) References Cited

U.S. PATENT DOCUMENTS

| | | | |
|---|---|---|---|
| 5,369,390 A * | 11/1994 | Lin et al. | 338/21 |
| 5,854,586 A * | 12/1998 | McMillan et al. | 338/21 |
| 6,100,785 A * | 8/2000 | Kato et al. | 338/21 |
| 6,184,770 B1 * | 2/2001 | Nakamura et al. | 338/21 |

FOREIGN PATENT DOCUMENTS

| | | |
|---|---|---|
| JP | 53-11076 | 4/1978 |
| JP | 63-16601 | 1/1988 |
| JP | 1-25205 | 5/1989 |
| JP | 2-49524 | 10/1990 |
| JP | 07-029709 A1 | 1/1995 |
| JP | 07-201531 | 8/1995 |
| JP | 2000-277306 | 10/2000 |

OTHER PUBLICATIONS

English translation to JP63-16601 to Yamagichi (Jan. 1988).*

* cited by examiner

*Primary Examiner*—Tu Hoang
(74) *Attorney, Agent, or Firm*—Dickstein, Shapiro, Morin & Oshinsky, LLP.

(57) ABSTRACT

A varistor is provided which can be driven at a low voltage, has a small leak current, and can realize a high ESD resistance and a high surge resistance. The varistor is formed using a ceramic composition for a varistor which contains zinc oxide as a primary component and sub-components including praseodymium at a content of 0.05 to 3.0 atomic percent of the total, cobalt at a content of 0.5 to 10 atom percent of the total, at least one of potassium, sodium, and lithium at a total content of 0.005 to 0.5 atom percent of the total, at least one of aluminum, gallium, and indium at a total content of $2\times10^{-5}$ to 0.5 atom percent of the total, and zirconium at a content of 0.005 to 5.0 atom percent of the total.

19 Claims, 7 Drawing Sheets

US 7,075,404 B2

PORCELAIN COMPOSITION FOR VARISTOR AND VARISTOR

TECHNICAL FIELD

The present invention relates to ceramic compositions for varistors used for electrostatic protection elements, noise filters, and the like and to the varistors, and more particularly, relates to a ceramic composition for a varistor primarily composed of ZnO and the varistor.

BACKGROUND ART

Heretofore, for protection against overvoltage, varistors having a monolayer sintered body primarily composed of ZnO have been widely used. In recent years, in addition to the protection against overvoltage, as electrostatic discharge (ESD) protection elements and noise filters, multilayer varistors composed of a plurality of internal electrodes disposed in a sintered body have been increasingly used.

In addition, concomitant with the trend toward higher integration and lower drive voltage of electronic apparatuses such as mobile communication apparatuses and notebook personal computers, varistors have been strongly required to be stably driven at a lower rated voltage and to have superior reliability.

In electronic apparatuses, ESD may occur frequently at interface portions with the exterior, and as elements for protecting interior devices, a great number of Zener diodes and chip type varistors have been widely used. The chip type varistors have no polarity in current-voltage characteristics (I–V characteristics) and have bi-directional characteristics. Accordingly, as compared to SMD type Zener diodes incorporating two elements, when the chip type varistors are used, reduction in cost and reduction in mounting area can be achieved.

Incidentally, the threshold voltage (hereinafter referred to as "varistor voltage") of varistors using a sintered body primarily composed of ZnO is proportional to the number of grain boundaries present between electrodes. It has been believed that the varistor voltage per one grain boundary is between 2 to 3 V. Accordingly, in order to form a varistor to be driven at a low voltage of 30 V or less, the number of grain boundaries present between electrodes must be not more than ten and several.

As a method for decreasing the number of grain boundaries between electrodes, there may be mentioned a method for decreasing the thickness of a characteristic layer (that is, the varistor layer) to decrease the number of grain boundaries and a method for increasing the grain diameter to decrease the number of grain boundaries. In the method for decreasing the thickness of a characteristic layer, due to the presence of pin holes or the variation in thickness of green sheets, which are sheets before a sintering step is performed for forming the characteristic layer, the properties may significantly vary in some cases, and in addition, grain strength may be decreased in some cases. On the other hand, in the method for increasing the grain diameter, the growth of grains must be facilitated, and hence abnormal growth of grains is liable to occur, thereby increasing the variation in grain diameter. As a result, the variation in properties may be increased in some cases.

Accordingly, when a multilayer varistor to be driven at a low voltage is formed, in order to maintain element strength and to decrease the variation in properties, the sintered body layer present between internal electrodes, that is, the characteristic layer must have a thickness at a certain level or more, and in addition, the variation in grain diameter must be decreased.

A varistor material primarily composed of ZnO is generally categorized into a material containing a Bi base sub-component formed of $Bi_2O_3$, $Sb_2O_3$, CoO, MnO, and the like disclosed, for example, in Japanese Examined Patent Application Publication No. 53-11076 and a material containing a Pr base sub-component formed of $Pr_6O_{11}$, CoO, and the like disclosed, for example, in Japanese Examined Patent Application Publication No. 56-11076.

By the use of the barrister material containing a Bi base sub-component, a varistor suitably used for overvoltage protection for a large current application can be easily supplied at a relatively low cost. However, in firing, $Bi_2O_3$ or $Sb_2O_3$ having a low melting point tended to form a liquid phase and was also liable to evaporate. As a result, it was difficult to decrease the variation in grain diameter. Accordingly, when the number of grain boundaries was decreased for realizing a lower drive voltage, the variation in properties was inevitably increased due to the variation in grain diameter. Consequently, it has been difficult to stably manufacture and supply multilayer varistors which can be driven at a lower voltage and which has superior reliability. In addition, since the variation in grain diameter was liable to increase, a surge current or ESD was concentrated at positions at which grains having a large grain diameter were present, and the resistances against surge current and ESD were also liable to decrease.

On the other hand, in the varistor material containing a Pr base sub-component, $Bi_2O_3$ and $Sb_2O_3$ are not contained which form a liquid phase at a low temperature and which are liable to evaporate. Accordingly, varistors having stable and superior properties can be manufactured in mass production and can be supplied. However, as compared to the varistor material containing a Bi base sub-component, the varistor material containing a Pr base sub-component had a problem of a large leak current. In order to realize a lower drive voltage, when the thickness of the characteristic layer is decreased, the leak current is further increased, and the insulation resistance and the voltage non-linearity are degraded. Hence, there have been problems in that the power consumption is increased and that the malfunction of signal circuits occurs. In order to decrease the leak current, it is effective that the donor concentration in ZnO grains be decreased or that a larger amount of an insulating material be added. However, when the methods described above are used, the surge resistant is significantly decreased.

When a conventional varistor material containing a Pr base sub-component is used, in a multilayer chip type varistor which can be driven at a low voltage of 30 V or less, it has been difficult to suppress the leak current and to realize a high surge resistance.

In Japanese Unexamined Patent Application Publication No. 7-29709, a voltage non-linear resistor has been disclosed which can be driven at a low voltage and which has a high surge resistance and a large resistance against electrostatic discharge. In this technique, a voltage non-linear resistor has been disclosed having a composition containing ZnO as a primary component, and $Pr_6O_{11}$, $Bi_2O_3$, $Mn_3O_4$, and CoO as sub-components. However, since $Bi_2O_3$ tends to form a liquid phase at a low temperature or is liable to evaporate, it has been difficult to obtain uniform particle diameters. In addition, it has also been difficult to stably supply a voltage non-linear resistor which has superior reliability and which can be driven at a low voltage.

In consideration of the present situation of the conventional techniques described above, an object of the present invention is to obtain a ceramic composition for a varistor and the varistor, the ceramic composition capable of forming a highly reliable varistor which can be stably driven at a low voltage and which has a small leak current, a high surge resistance, and a large ESD resistance.

DISCLOSURE OF INVENTION

A ceramic composition for a varistor, according to the present invention,.comprises: zinc oxide as a primary component; and sub-components including praseodymium at a content of 0.05 to 3.0 atomic percent of the total, cobalt at a content of 0.5 to 10 atom percent of the total, at least one of potassium, sodium, and lithium at a total content of 0.005 to 0.5 atom percent of the total, at least one of aluminum, gallium, and indium at a total content of $2\times10^{-5}$ to 0.5 atom percent of the total, and zirconium at a content of 0.005 to 5.0 atom percent of the total.

A varistor of the present invention comprises a sintered body and a plurality of terminal electrodes formed on exterior surfaces of the sintered body, the sintered body having a ceramic composition which is used for forming a varistor and which has the above specific composition. The structure thereof is not particularly limited. That is, there may be provided a monolayer varistor composed of a monolayer varistor substrate of the sintered body described above and exterior electrodes provided on two surfaces thereof. However, in accordance with one specific aspect of the present invention, in the sintered body described above, a plurality of interior electrodes is formed to be laminated to each other with sintered body layers provided therebetween, and the interior electrodes mentioned above are electrically connected to respective exterior electrodes, thereby forming a multilayer varistor. Hence, in particular, a multilayer varistor can be provided which can be driven at a low voltage, such as at a rated voltage of 30 V or less, and which has a small leak current, a high surge resistance, a sufficiently large ESD resistance, and superior reliability.

BEST MODE FOR CARRYING OUT THE INVENTION

Figure 1:
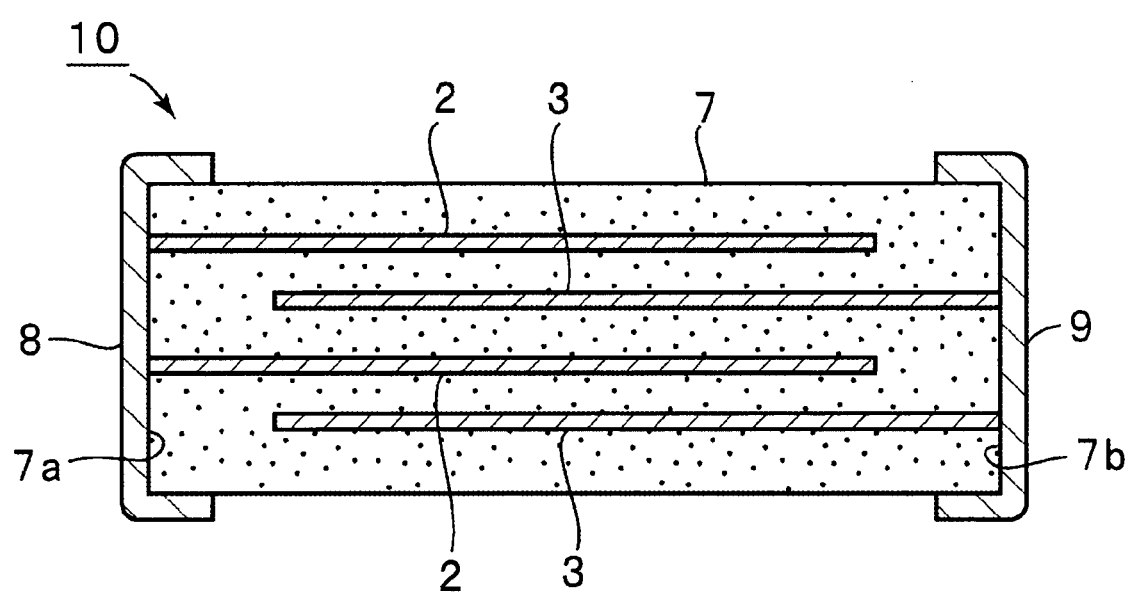
FIG. 1 is a schematic cross-sectional view showing the structure of a multilayer varistor according to one example of the present invention.

In the ceramic composition for a varistor, according to the present invention, as a sub-component, at least one of calcium, strontium, and barium is preferably further contained at a total content of 1.0 atom percent or less of the total. In this case, the insulation resistance IR can be further increased.

In the present invention, as a sub-component, at least one of lanthanum, neodymium, samarium, europium, gadolinium, terbium, dysprosium, holmium, erbium, thulium, ytterbium, and yttrium is preferably further contained at a total content of 1.0 atom percent or less of the total. In this case, the surge resistance can be further improved.

In the present invention, the zirconium is preferably contained at a content of 0.01 to 5.0 atom percent of the total, and in this case, even when the varistor voltage is lower, a large ESD resistance can be obtained.

The zirconium is more preferably contained at a content of 0.05 to 5.0 atom percent of the total, and even at a lower working voltage, a sufficient ESD resistance can be obtained.

In the ceramic composition for a varistor, according to the present invention, the reason the content of praseodymium (Pr) is set in the range of from 0.05 to 3.0 atom percent is that when the content is less than 0.05 atom percent, the supply amount of oxygen from $Pr_6G_{11}$ is decreased, and the initial insulation resistance and the ESD resistance are decreased. On the other hand, when the content is more than 3.0 atom percent, $Pr_6O_{11}$ segregates primarily in the grain boundaries, and the variation in grain diameter is increased. Consequently, current or an electric field is locally concentrated, and hence the surge resistance and the ESD resistance are decreased.

The reasons the content of Co is set in the range of from 0.5 to 10 atom percent are as follows. When the content is less than 0.5 atom percent, the density at the boundary level is decreased, and the initial insulation resistance and the ESD resistance are decreased. On the other hand, when the content is more than 10 atom percent, since Co is not totally dissolved in ZnO and segregates in the grain boundaries, the electron conduction is decreased, and the surge resistance and the ESD resistance are decreased.

The reasons the total content of at least one of potassium (K), sodium (Na), and lithium (Li) is set in the range of from 0.005 to 0.5 atom percent are as follows. When the content is less than 0.005 atom percent, K, Na, and/or Li cannot insulate all the grain boundaries, and as a result, the initial insulation resistance is decreased. When the content is more than 0.5 atom percent, since K, Na, and/or Li is excessively dissolved in ZnO, the resistance in the grains is increased, and the surge resistance and the ESD resistance are decreased.

The reasons the total content of at least one of aluminum (Al), gallium (Ga), and indium (In) is set in the range of from $2\times10^{-5}$ to 0.5 atom percent are as follows. When the content is less than $2\times10^{-5}$ atom percent, the resistance in the grains is excessively increased, and the surge resistance and the ESD resistance are decreased. When the content is more than 0.5 atom percent, the resistance in the grains is excessively decreased, and the initial insulation resistance is decreased.

The reasons the content of zirconium (Zr) is set in the range of from 0.005 to 5.0 atom percent are as follows.

When the content is less than 0.005 atom percent, abnormal grain growth cannot be suppressed, the variation in grain diameter cannot be controlled, and the reduction in defective grain boundaries cannot be achieved. As a result, the surge resistance and the ESD resistance are decreased. When the content is more than 5.0 atom percent, since $ZrO_2$ segregates primarily in the grain boundaries, although the insulation resistance is improved, the sintering properties are degraded, and the surge resistance and the ESD resistance are decreased.

The reason the total content of at least one of calcium (Ca), strontium (Sr), and barium (Ba) is preferably set to 1.0 atom percent or less is as follows. When the content is more than 1.0 atom percent, since the segregation thereof excessively occurs in the grain boundaries, the electron conduction is decreased, the insulation resistance may be increased in some cases, and the surge resistance and the ESD resistance may be decreased in some cases.

In addition, in the present invention, the total content of at least one of lanthanum (La), neodymium (Nd), samarium (Sm), europium (Eu), gadolinium (Gd), terbium (Tb), dysprosium (Dy), holmium (Ho), erbium (Er), thulium (Tm), ytterbium (Yb), and yttrium (Y) is preferably set to 1.0 atom percent or less and more preferably set in the range of from 0.01 to 0.5 atom percent. When lanthanum is contained, the surge resistance can be more effectively enhanced.

EXAMPLES

Hereinafter, the present invention will be described with reference to particular examples.

Example 1

In Example 1, among Pr, Co, K, Al, and Zr used as a sub-component, samples in which the content of Pr was primarily changed were formed, and the properties thereof were evaluated.

First, ZnO, $Pr_6O_{11}$, CoO, $K_2CO_3$, $Al_2O_3$, and $ZrO_2$ powders used as starting materials were weighed so that a ceramic sintered body after firing had a predetermined composition and were then wet-mixed by a ball mill for 24 hours, thereby forming a mixed slurry. After dehydrated and dried, the mixed slurry was calcined at a temperature of 700 to 1,100° C. for 2 hours in the air, thereby forming a calcined raw material. The calcined raw material thus obtained was again sufficiently pulverized using a ball mill, and subsequently, dehydration and drying were performed. An organic binder, an organic plasticizer, and a dispersing agent were added to the raw material thus dried, and a mixture thus formed was mixed for 12 hours using a ball mill, thereby forming a slurry.

The slurry thus formed was processed on a PET film by a doctor blade method to form a green sheet 25 μm thick. The green sheet thus prepared was cut into a rectangular shape.

Next, a Pt paste was screen-printed on the rectangular ceramic green sheet, thereby forming an internal electrode pattern. A plurality of ceramic green sheets having internal electrode patterns printed thereon was laminated, and plain ceramic green sheets were provide on the top and the bottom of the laminate thus formed, thereby forming a mother laminate.

Figure 2:
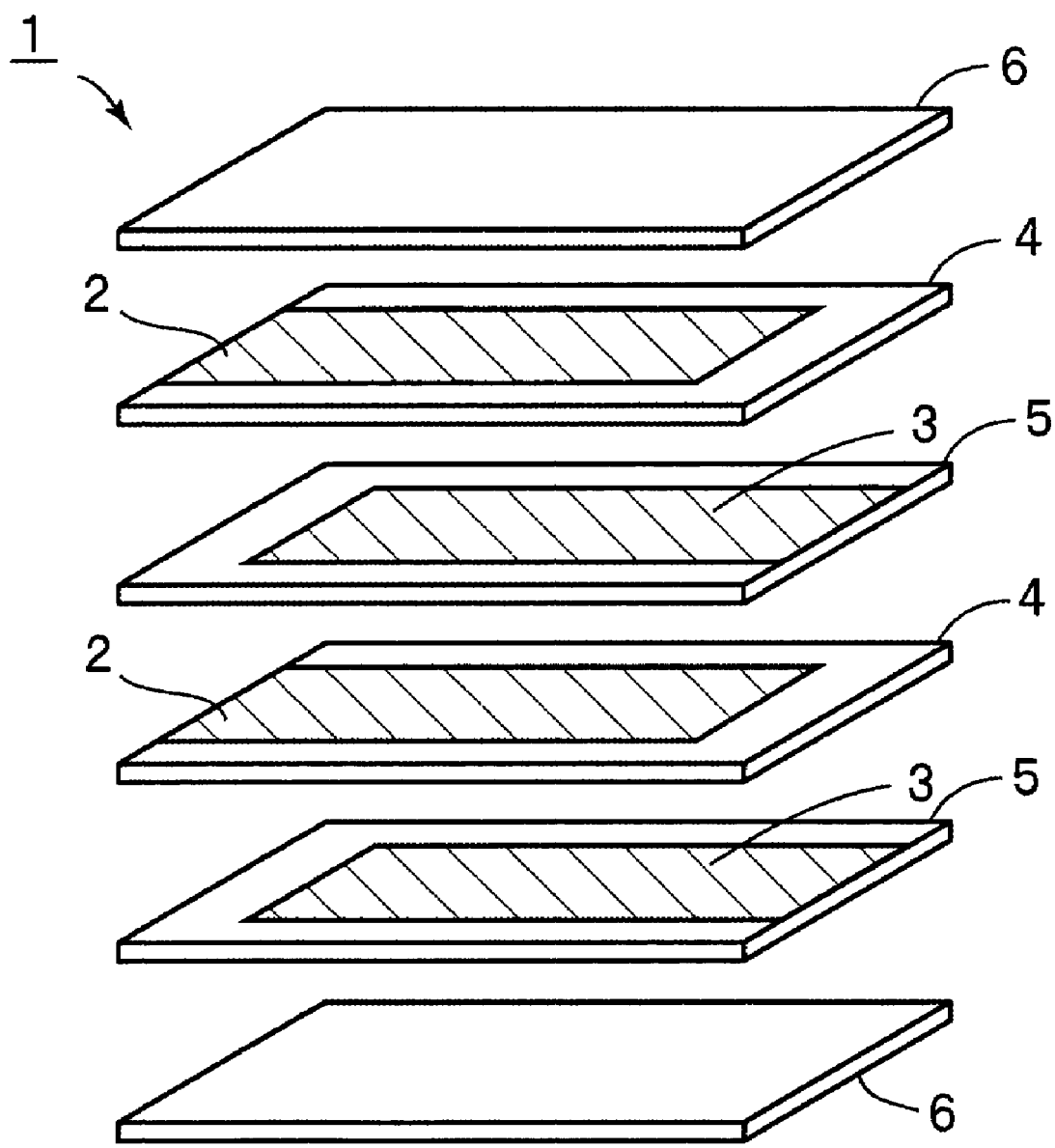
FIG. 2 is a schematic, exploded, perspective view of a laminate used for the multilayer varistor sown in FIG. 1.

The mother laminate thus formed was pressed at a pressure of $1.96 \times 10^8$ Pa and was then cut into laminates each having a size for forming a varistor. As described above, a laminate 1 schematically shown in an exploded perspective view of FIG. 2 was obtained. In the laminate 1, ceramic green sheets 4 and 5 provided with internal electrodes 2 and 3, respectively, were alternately laminated to each other in the lamination direction. That is, the ceramic green sheets 4 and 5 are laminated to each other so that the end surfaces of the internal electrodes 2 and 3 are alternately disposed at the sides opposite to each other in the lamination direction. In this laminate, reference numeral 6 indicates a plain ceramic green sheet.

In the laminate 1 obtained as described above, the number of the laminated internal electrodes was set to 10, the overlapping area between the internal electrodes was set to 2.3 mm², the length of the laminate was set to 1.6 mm, the width was set to 0.8 mm, and the thickness was set to 0.8 mm.

The laminate 1 thus obtained was heated to 500° C. for 12 hours in the air, thereby removing the organic binder. Subsequently, firing was performed at 1,150 to 1,250° C. for 2 hours in the air, thereby forming a ceramic sintered body.

As shown in FIG. 1, an Ag paste was applied onto two end surfaces 7a and 7b of a sintered body 7 thus formed, followed by firing at a temperature of 800° C. in the air, so that exterior electrodes 8 and 9 were formed, and hence a multilayer varistor 10 was formed.

Figure 3:
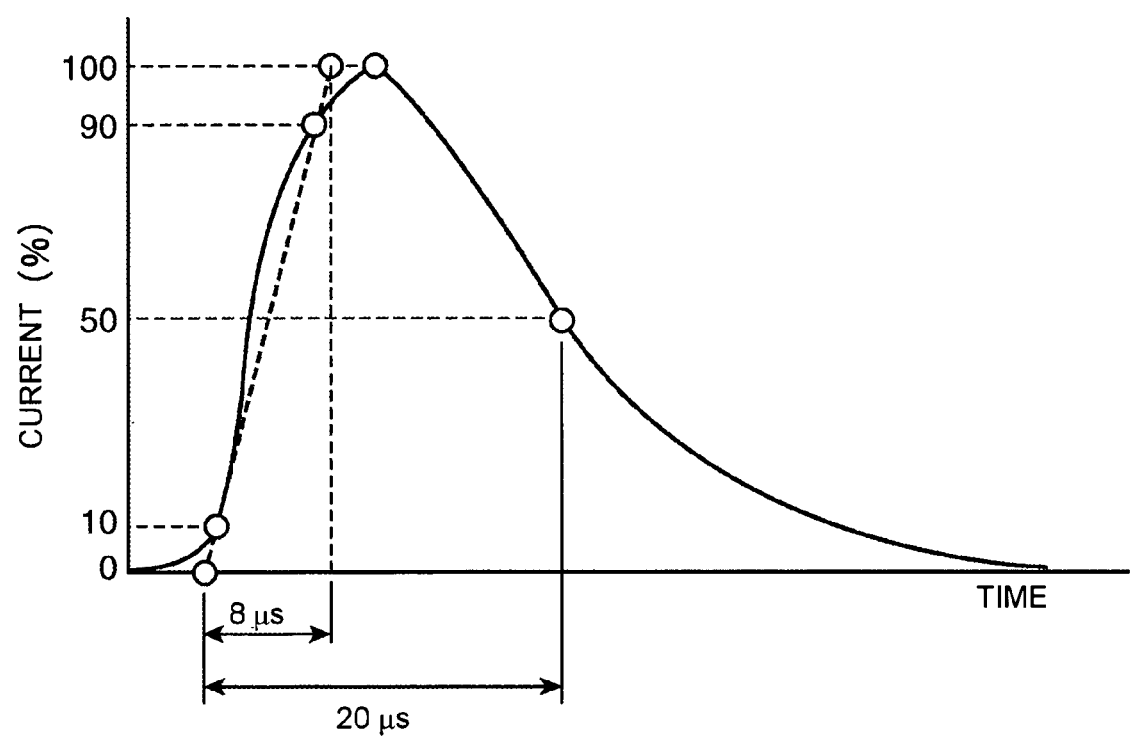
FIG. 3 is a graph showing a surge waveform used for a surge test.
Figure 4:
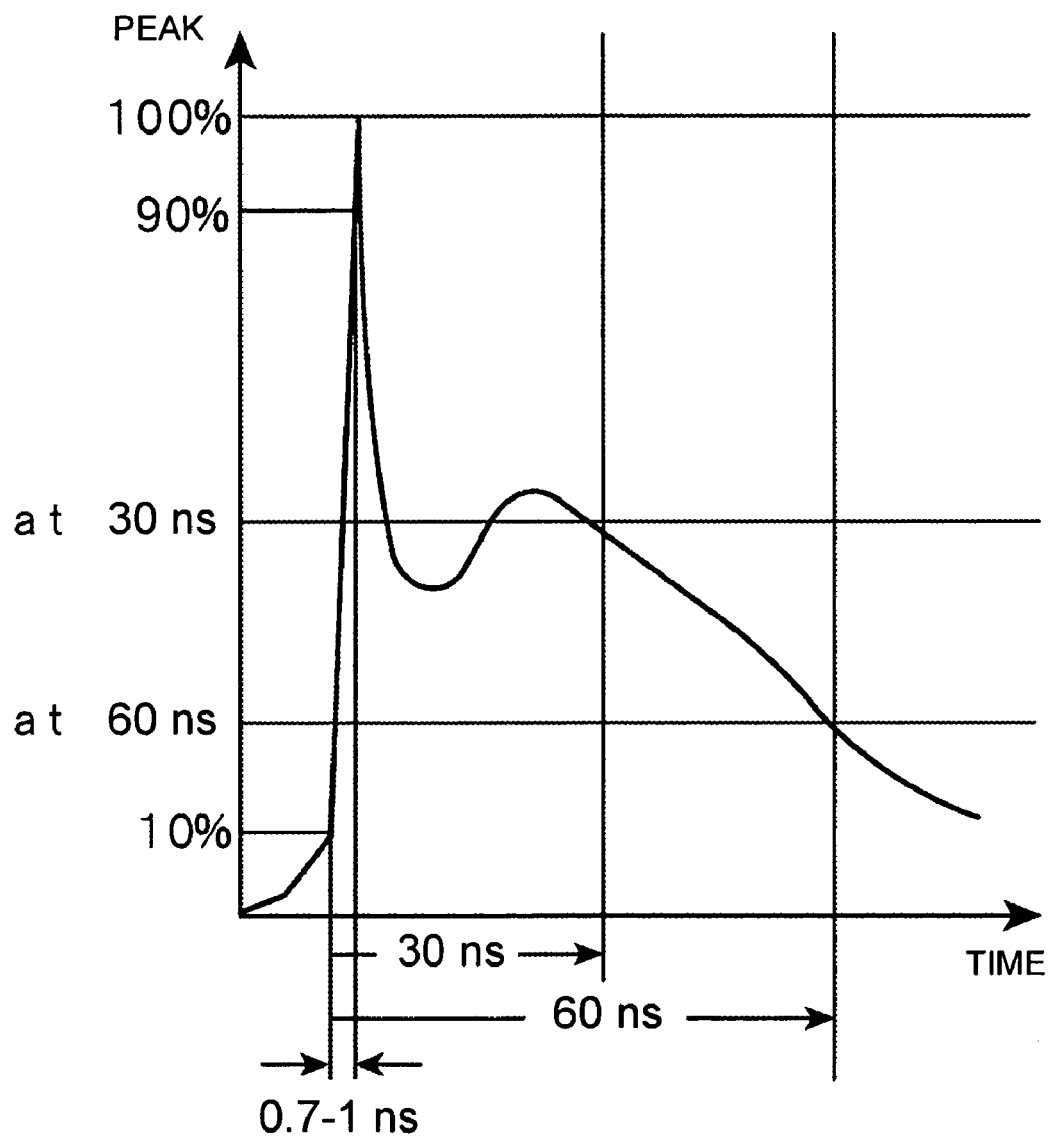
FIG. 4 is a graph showing an ESD waveform used for an ESD resistance test.

Next, the following measurement was performed for the multilayer varistor thus formed. That is, (1) varistor voltage ($V_{1mA}$), (2) initial insulation resistance (IR) obtained when 60% of the varistor voltage was applied for 0.1 second, (3) surge resistance, and (4) ESD resistance were measured. For the evaluation of the surge resistance, the varistor voltage was obtained after a triangle electrical waveform of 8×20 μs shown in FIG. 3 was applied twice at an interval of 5 minutes, and when the ratio of the rate of change of varistor voltage, $\Delta V_{1mA}$, to the initial varistor voltage $V_{1mA}$, that is, when $\Delta V_{1mA}/V_{1mA}$ was within 10%, and when the change of IR, that is, when $\Delta \log IR$ was within ½, the maximum current wave height was measured. For the evaluation of the ESD resistance, after an ESD pulse in accordance with IEC801-2 shown in FIG. 4 was applied 10 times from a pair of exterior electrodes of each multilayer varistor, when the rate of change of varistor voltage, $\Delta V_{1mA}/V_{1mA}$, was within 10%, and when the change of IR, $\Delta \log IR$, was within ½, the maximum application voltage was measured.

The results are shown in the following Table 1. In addition, in Table 1, the compositions of the sintered bodies of the individual varistors formed in Example 1 are also shown.

In the following tables, the samples provided with asterisks are samples each contain zinc oxide as a primary component and sub-components including praseodymium at a content of 0.05 to 3.0 atomic percent of the total, cobalt at a content of 0.5 to 10 atom percent of the total, at least one of potassium, sodium, and lithium at a total content of 0.005 to 0.5 atom percent of the total, at least one of aluminum, gallium, and indium at a total content of $2 \times 10^{-5}$ to 0.5 atom percent of the total, and zirconium at a content of 0.005 to 5.0 atom percent of the total.

TABLE 1

| SAMPLE NO. | ADDITION ELEMENT (atom %) | | | | | INITIAL IR | VARISTOR VOLTAGE | SURGE RESISTANCE | ESD RESISTANCE |
|---|---|---|---|---|---|---|---|---|---|
| | Pr | Co | K | Al | Zr | | | | |
| * 1 | 0 | 2.0 | 0.05 | $1 \times 10^{-4}$ | 0.1 | 0.05 MΩ | 8.8 V | 15 A | 2 kV |
| * 2 | 0.01 | 2.0 | 0.05 | $1 \times 10^{-4}$ | 0.1 | 0.15 MΩ | 9.1 V | 17 A | 2 kV |
| * 3 | 0.03 | 2.0 | 0.05 | $1 \times 10^{-4}$ | 0.1 | 0.5 MΩ | 9.0 V | 17 A | 5 kV |
| 4 | 0.05 | 2.0 | 0.05 | $1 \times 10^{-4}$ | 0.1 | 1.0 MΩ | 8.7 V | 20 A | 30 kV |
| 5 | 0.1 | 2.0 | 0.05 | $1 \times 10^{-4}$ | 0.1 | 1.6 MΩ | 9.1 V | 20 A | 30 kV |
| 6 | 0.3 | 2.0 | 0.05 | $1 \times 10^{-4}$ | 0.1 | 1.8 MΩ | 9.4 V | 25 A | 30 kV |
| 7 | 0.5 | 2.0 | 0.05 | $1 \times 10^{-4}$ | 0.1 | 3.2 MΩ | 9.2 V | 21 A | 30 kV |
| 8 | 1 | 2.0 | 0.05 | $1 \times 10^{-4}$ | 0.1 | 3.5 MΩ | 8.8 V | 20 A | 30 kV |
| 9 | 3 | 2.0 | 0.05 | $1 \times 10^{-4}$ | 0.1 | 4.1 MΩ | 9.4 V | 20 A | 30 kV |
| * 10 | 5 | 2.0 | 0.05 | $1 \times 10^{-4}$ | 0.1 | 7.5 MΩ | 9.4 V | 17 A | 15 kV |
| * 11 | 6 | 2.0 | 0.05 | $1 \times 10^{-4}$ | 0.1 | 8.2 MΩ | 9.0 V | 14 A | 5 kV |
| 12 | 3 | 0.5 | 0.05 | $1 \times 10^{-4}$ | 0.1 | 2.1 MΩ | 8.8 V | 20 A | 30 kV |
| 13 | 0.05 | 10.0 | 0.05 | $1 \times 10^{-4}$ | 0.1 | 2.3 MΩ | 9.0 V | 22 A | 30 kV |
| 14 | 3 | 10.0 | 0.05 | $1 \times 10^{-4}$ | 0.1 | 5.8 MΩ | 8.9 V | 20 A | 30 kV |
| 15 | 0.05 | 2.0 | 0.5 | $1 \times 10^{-4}$ | 0.1 | 3.9 MΩ | 9.1 V | 21 A | 30 kV |
| 16 | 3 | 2.0 | 0.005 | $1 \times 10^{-4}$ | 0.1 | 2.0 MΩ | 9.0 V | 25 A | 30 kV |
| 17 | 3 | 2.0 | 0.5 | $1 \times 10^{-4}$ | 0.1 | 4.2 MΩ | 9.2 V | 21 A | 30 kV |
| 18 | 0.05 | 2.0 | 0.05 | $2 \times 10^{-5}$ | 0.1 | 3.1 MΩ | 9.0 V | 22 A | 30 kV |
| 19 | 3 | 2.0 | 0.05 | $2 \times 10^{-5}$ | 0.1 | 5.3 MΩ | 8.7 V | 20 A | 30 kV |
| 20 | 3 | 2.0 | 0.05 | 0.5 | 0.1 | 1.3 MΩ | 9.1 V | 27 A | 30 kV |
| 21 | 0.05 | 2.0 | 0.05 | $1 \times 10^{-4}$ | 0.05 | 1.1 MΩ | 9.0 V | 24 A | 30 kV |
| 22 | 0.05 | 2.0 | 0.05 | $1 \times 10^{-4}$ | 5 | 1.9 MΩ | 9.1 V | 21 A | 30 kV |
| 23 | 3 | 2.0 | 0.05 | $1 \times 10^{-4}$ | 0.05 | 2.8 MΩ | 9.0 V | 22 A | 30 kV |
| 24 | 3 | 2.0 | 0.05 | $1 \times 10^{-4}$ | 5 | 4.1 MΩ | 9.1 V | 20 A | 30 kV |

As can be seen from Table 1, according to sample Nos. 1 to 3, since the Pr content was less than 0.05 atom percent, the initial IR, the surge resistance, and the ESD resistance were low. According to sample Nos. 10 and 11, since the Pr content was more than 3.0 atom percent, although the initial IR was high, the surge resistance and the ESD resistance were low.

On the other hand, according to sample Nos. 4 to 9 and 12 to 24, since the Pr content was in the range of from 0.05 to 3.0 atom percent, very superior properties could be obtained, that is, the varistor voltage was low, such as approximately 9 V, the initial insulation resistance IR was 1.0 MΩ or more, the surge resistance was 20 A or more, and in addition, the ESD resistance was 30 kV. Accordingly, since a sample having a Pr content in the range of from 0.05 to 3.0 atom percent was used, in a chip type varistor designed to cooperate with a circuit driven at a low voltage, such as a rated voltage of 30 V or less, the leak current could be decreased, and a high surge resistance and a high ESD resistance could be realized.

Example 2

In Example 2, among Pr, Co, K, Al, and Zr used as a sub-component, samples in which the content of Co was primarily changed were formed, and the properties thereof were evaluated.

Except that the contents of the sub-components were changed as shown in the following Table 2, multilayer varistors were formed in the same manner as that in Example 1, and the evaluation was performed. The results are shown in Table 2 below.

TABLE 2

| SAMPLE NO. | ADDITION ELEMENT (atom %) | | | | | INITIAL IR | VARISTOR VOLTAGE | SURGE RESISTANCE | ESD RESISTANCE |
|---|---|---|---|---|---|---|---|---|---|
| | Pr | Co | K | Al | Zr | | | | |
| * 25 | 0.3 | 0.1 | 0.05 | $1 \times 10^{-4}$ | 0.1 | 0.04 MΩ | 9.1 V | 15 A | 2 kV |
| * 26 | 0.3 | 0.3 | 0.05 | $1 \times 10^{-4}$ | 0.1 | 0.5 MΩ | 9.0 V | 18 A | 5 kV |
| 27 | 0.3 | 0.5 | 0.05 | $1 \times 10^{-4}$ | 0.1 | 1.0 MΩ | 8.8 V | 20 A | 30 kV |
| 28 | 0.3 | 1 | 0.05 | $1 \times 10^{-4}$ | 0.1 | 1.6 MΩ | 8.9 V | 20 A | 30 kV |
| 29 | 0.3 | 2 | 0.05 | $1 \times 10^{-4}$ | 0.1 | 1.8 MΩ | 9.4 V | 25 A | 30 kV |
| 30 | 0.3 | 4 | 0.05 | $1 \times 10^{-4}$ | 0.1 | 2.5 MΩ | 9.1 V | 21 A | 30 kV |
| 31 | 0.3 | 5 | 0.05 | $1 \times 10^{-4}$ | 0.1 | 2.7 MΩ | 9.2 V | 21 A | 30 kV |
| 32 | 0.3 | 8 | 0.05 | $1 \times 10^{-4}$ | 0.1 | 3.2 MΩ | 9.0 V | 20 A | 30 kV |
| 33 | 0.3 | 10 | 0.05 | $1 \times 10^{-4}$ | 0.1 | 4.1 MΩ | 8.9 V | 20 A | 30 kV |
| * 34 | 0.3 | 12 | 0.05 | $1 \times 10^{-4}$ | 0.1 | 6.0 MΩ | 8.8 V | 18 A | 15 kV |
| 35 | 0.3 | 0.5 | 0.5 | $1 \times 10^{-4}$ | 0.1 | 2.3 MΩ | 8.8 V | 21 A | 30 kV |
| 36 | 0.3 | 10 | 0.005 | $1 \times 10^{-4}$ | 0.1 | 3.9 MΩ | 8.9 V | 23 A | 30 kV |
| 37 | 0.3 | 10 | 0.5 | $1 \times 10^{-4}$ | 0.1 | 5.3 MΩ | 9.1 V | 20 A | 30 kV |
| 38 | 0.3 | 0.5 | 0.05 | $2 \times 10^{-5}$ | 0.1 | 1.0 MΩ | 9.5 V | 21 A | 30 kV |
| 39 | 0.3 | 10 | 0.05 | $2 \times 10^{-5}$ | 0.1 | 4.5 MΩ | 8.7 V | 20 A | 30 kV |
| 40 | 0.3 | 10 | 0.05 | 0.5 | 0.1 | 2.3 MΩ | 9.0 V | 29 A | 30 kV |

TABLE 2-continued

| SAMPLE NO. | ADDITION ELEMENT (atom %) | | | | | INITIAL IR | VARISTOR VOLTAGE | SURGE RESIS- TANCE | ESD RESIS- TANCE |
|---|---|---|---|---|---|---|---|---|---|
| | Pr | Co | K | Al | Zr | | | | |
| 41 | 0.3 | 0.5 | 0.05 | $1 \times 10^{-4}$ | 5 | 2.1 MΩ | 8.7 V | 20 A | 30 kV |
| 42 | 0.3 | 10 | 0.05 | $1 \times 10^{-4}$ | 0.05 | 5.6 MΩ | 8.8 V | 23 A | 30 kV |
| 43 | 0.3 | 10 | 0.05 | $1 \times 10^{-4}$ | 5 | 6.2 MΩ | 9.3 V | 20 A | 30 kV |

As can be seen from Table 2, according to sample Nos. 25 and 26, since the Co content was less than 0.5 atom percent, the initial IR and the ESD resistance were low. According to sample No. 34, since the Co content was more than 10 atom percent, although the initial IR was high, the surge resistance and the ESD resistance were low.

On the other hand, according to sample Nos. 27 to 33 and 35 to 43, since the Co content was set in the range of from 0.5 to 10 atom percent, although the varistor voltage was low, such as approximately 9 V, the initial insulation resistance IR was 1.0 MΩ or more, the surge resistance was 20 A or more, and the ESD resistance was 30 kV.

Accordingly, since the content of Co was set in the range of from 0.5 to 10 atom percent, in a multilayer varistor designed to cooperate with a circuit driven at a low voltage, such as a rated voltage of 30 V or less, it was understood that the leak current could be decreased, and a high surge resistance and a high ESD resistance could be realized.

Example 3

In Example 3, among Pr, Co, K, Al, and Zr used as a sub-component, samples in which the content of K was primarily changed were formed, and the properties thereof were evaluated.

Except that the contents of the sub-components were changed as shown in the following Table 2, multilayer varistors were formed in the same manner as that in Example 1, and the evaluation was performed. The results are shown in Table 3 below.

TABLE 3

| SAMPLE NO. | ADDITION ELEMENT (atom %) | | | | | INITIAL IR | VARISTOR VOLTAGE | SURGE RESIS- TANCE | ESD RESIS- TANCE |
|---|---|---|---|---|---|---|---|---|---|
| | Pr | Co | K | Al | Zr | | | | |
| * 44 | 0.3 | 2.0 | 0 | $1 \times 10^{-4}$ | 0.1 | 0.001 MΩ | 8.7 V | 30 A | 30 kV |
| * 45 | 0.3 | 2.0 | 0.001 | $1 \times 10^{-4}$ | 0.1 | 0.02 MΩ | 8.9 V | 29 A | 30 kV |
| * 46 | 0.3 | 2.0 | 0.003 | $1 \times 10^{-4}$ | 0.1 | 0.4 MΩ | 9.2 V | 29 A | 30 kV |
| 47 | 0.3 | 2.0 | 0.005 | $1 \times 10^{-4}$ | 0.1 | 1.0 MΩ | 9.0 V | 27 A | 30 kV |
| 48 | 0.3 | 2.0 | 0.01 | $1 \times 10^{-4}$ | 0.1 | 1.4 MΩ | 9.2 V | 26 A | 30 kV |
| 49 | 0.3 | 2.0 | 0.05 | $1 \times 10^{-4}$ | 0.1 | 1.8 MΩ | 9.4 V | 25 A | 30 kV |
| 50 | 0.3 | 2.0 | 0.08 | $1 \times 10^{-4}$ | 0.1 | 2.2 MΩ | 8.9 V | 25 A | 30 kV |
| 51 | 0.3 | 2.0 | 0.1 | $1 \times 10^{-4}$ | 0.1 | 2.9 MΩ | 9.0 V | 24 A | 30 kV |
| 52 | 0.3 | 2.0 | 0.3 | $1 \times 10^{-4}$ | 0.1 | 3.2 MΩ | 9.1 V | 20 A | 30 kV |
| 53 | 0.3 | 2.0 | 0.5 | $1 \times 10^{-4}$ | 0.1 | 3.4 MΩ | 9.0 V | 20 A | 30 kV |
| * 54 | 0.3 | 2.0 | 0.8 | $1 \times 10^{-4}$ | 0.1 | 4.2 MΩ | 8.8 V | 15 A | 15 kV |
| * 55 | 0.3 | 2.0 | 1 | $1 \times 10^{-4}$ | 0.1 | 6.0 MΩ | 8.9 V | 11 A | 5 kV |
| 56 | 0.3 | 2.0 | 0.005 | $2 \times 10^{-5}$ | 0.1 | 1.5 MΩ | 9.1 V | 25 A | 30 kV |
| 57 | 0.3 | 2.0 | 0.005 | 0.5 | 0.1 | 1.1 MΩ | 9.3 V | 33 A | 30 kV |
| 58 | 0.3 | 2.0 | 0.5 | $2 \times 10^{-5}$ | 0.1 | 3.7 MΩ | 8.7 V | 20 A | 30 kV |
| 59 | 0.3 | 2.0 | 0.5 | 0.5 | 0.1 | 2.0 MΩ | 9.0 V | 29 A | 30 kV |
| 60 | 0.3 | 2.0 | 0.005 | $1 \times 10^{-4}$ | 0.05 | 1.2 MΩ | 9.1 V | 26 A | 30 kV |
| 61 | 0.3 | 2.0 | 0.005 | $1 \times 10^{-4}$ | 5 | 3.3 MΩ | 9.2 V | 21 A | 30 kV |
| 62 | 0.3 | 2.0 | 0.5 | $1 \times 10^{-4}$ | 0.05 | 3.2 MΩ | 9.1 V | 24 A | 30 kV |
| 63 | 0.3 | 2.0 | 0.5 | $1 \times 10^{-4}$ | 5 | 4.9 MΩ | 9.3 V | 20 A | 30 kV |

As can be seen from Table 3, according to sample Nos. 44 to 46, since the K content was less than 0.005 atom percent, the initial IR was low, and according to sample Nos. 54 and 55, since the K content was more than 0.5 atom percent, although the initial IR was high, the surge resistance and the ESD resistance were low.

On the other hand, according to sample Nos. 47 to 53 and 56 to 63, since the K content was set in the range of from 0.005 to 0.5 atom percent, although the varistor voltage was low, such as approximately 9 V, the initial IR was 1.0 MΩ or more, the surge resistance was 20 A or more, and the ESD resistance was 30 kV.

Accordingly, since the content of K was set in the range of from 0.005 to 0.5 atom percent, in a multilayer varistor designed to cooperate with a circuit driven at a low voltage, such as a rated voltage of 30 V or less, it was understood that the leak current could be decreased, and a high surge resistance and a high ESD resistance could be realized.

Subsequently, as shown in the following Tables 4 to 6, instead of K, samples containing Na or Li, and samples containing K, Na, and/or Li which were optionally combined with each other were evaluated in the same manner as that in Example 3 described above.

TABLE 4

| SAMPLE NO. | ADDITION ELEMENT (atom %) | | | | | INITIAL IR | VARISTOR VOLTAGE | SURGE RESISTANCE | ESD RESISTANCE |
|---|---|---|---|---|---|---|---|---|---|
| | Pr | Co | Na | Al | Zr | | | | |
| * 64 | 0.3 | 2.0 | 0.001 | $1 \times 10^{-4}$ | 0.1 | 0.1 MΩ | 9.1 V | 29 A | 30 kV |
| 65 | 0.3 | 2.0 | 0.005 | $1 \times 10^{-4}$ | 0.1 | 1.1 MΩ | 9.3 V | 29 A | 30 kV |
| 66 | 0.3 | 2.0 | 0.01 | $1 \times 10^{-4}$ | 0.1 | 1.8 MΩ | 9.0 V | 27 A | 30 kV |
| 67 | 0.3 | 2.0 | 0.05 | $1 \times 10^{-4}$ | 0.1 | 2.9 MΩ | 8.8 V | 27 A | 30 kV |
| 68 | 0.3 | 2.0 | 0.08 | $1 \times 10^{-4}$ | 0.1 | 3.3 MΩ | 9.4 V | 24 A | 30 kV |
| 69 | 0.3 | 2.0 | 0.1 | $1 \times 10^{-4}$ | 0.1 | 4.1 MΩ | 9.0 V | 23 A | 30 kV |
| 70 | 0.3 | 2.0 | 0.3 | $1 \times 10^{-4}$ | 0.1 | 4.5 MΩ | 9.0 V | 22 A | 30 kV |
| 71 | 0.3 | 2.0 | 0.5 | $1 \times 10^{-4}$ | 0.1 | 4.9 MΩ | 9.1 V | 20 A | 30 kV |
| * 72 | 0.3 | 2.0 | 0.8 | $1 \times 10^{-4}$ | 0.1 | 6.3 MΩ | 8.8 V | 10 A | 30 kV |
| 73 | 0.05 | 2.0 | 0.005 | $1 \times 10^{-4}$ | 0.1 | 1.3 MΩ | 9.3 V | 21 A | 30 kV |
| 74 | 0.05 | 2.0 | 0.5 | $1 \times 10^{-4}$ | 0.1 | 3.1 MΩ | 9.0 V | 20 A | 30 kV |
| 75 | 3 | 2.0 | 0.005 | $1 \times 10^{-4}$ | 0.1 | 3.8 MΩ | 9.1 V | 22 A | 30 kV |
| 76 | 3 | 2.0 | 0.5 | $1 \times 10^{-4}$ | 0.1 | 5.6 MΩ | 8.8 V | 20 A | 30 kV |
| 77 | 0.3 | 0.5 | 0.5 | $1 \times 10^{-4}$ | 0.1 | 2.0 MΩ | 9.0 V | 21 A | 30 kV |
| 78 | 0.3 | 10.0 | 0.005 | $1 \times 10^{-4}$ | 0.1 | 3.8 MΩ | 9.1 V | 21 A | 30 kV |
| 79 | 0.3 | 10.0 | 0.5 | $1 \times 10^{-4}$ | 0.1 | 5.1 MΩ | 9.3 V | 20 A | 30 kV |
| 80 | 0.3 | 2.0 | 0.005 | $2 \times 10^{-5}$ | 0.1 | 1.7 MΩ | 9.0 V | 24 A | 30 kV |
| 81 | 0.3 | 2.0 | 0.005 | 0.5 | 0.1 | 1.3 MΩ | 9.0 V | 30 A | 30 kV |
| 82 | 0.3 | 2.0 | 0.5 | $2 \times 10^{-5}$ | 0.1 | 4.0 MΩ | 8.9 V | 20 A | 30 kV |
| 83 | 0.3 | 2.0 | 0.5 | 0.5 | 0.1 | 2.5 MΩ | 9.1 V | 28 A | 30 kV |
| 84 | 0.3 | 2.0 | 0.005 | $1 \times 10^{-4}$ | 0.05 | 1.4 MΩ | 9.0 V | 27 A | 30 kV |
| 85 | 0.3 | 2.0 | 0.005 | $1 \times 10^{-4}$ | 5 | 3.5 MΩ | 8.8 V | 22 A | 30 kV |
| 86 | 0.3 | 2.0 | 0.5 | $1 \times 10^{-4}$ | 0.05 | 3.1 MΩ | 9.0 V | 25 A | 30 kV |
| 87 | 0.3 | 2.0 | 0.5 | $1 \times 10^{-4}$ | 5 | 4.8 MΩ | 9.1 V | 21 A | 30 kV |

TABLE 5

| SAMPLE NO. | ADDITION ELEMENT (atom %) | | | | | INITIAL IR | VARISTOR VOLTAGE | SURGE RESISTANCE | ESD RESISTANCE |
|---|---|---|---|---|---|---|---|---|---|
| | Pr | Co | Li | Al | Zr | | | | |
| * 88 | 0.3 | 2.0 | 0.001 | $1 \times 10^{-4}$ | 0.1 | 0.5 MΩ | 9.0 V | 27 A | 30 kV |
| 89 | 0.3 | 2.0 | 0.005 | $1 \times 10^{-4}$ | 0.1 | 2.0 MΩ | 8.9 V | 25 A | 30 kV |
| 90 | 0.3 | 2.0 | 0.01 | $1 \times 10^{-4}$ | 0.1 | 2.3 MΩ | 9.1 V | 24 A | 30 kV |
| 91 | 0.3 | 2.0 | 0.05 | $1 \times 10^{-4}$ | 0.1 | 3.4 MΩ | 8.8 V | 23 A | 30 kV |
| 92 | 0.3 | 2.0 | 0.08 | $1 \times 10^{-4}$ | 0.1 | 4.2 MΩ | 8.9 V | 23 A | 30 kV |
| 93 | 0.3 | 2.0 | 0.1 | $1 \times 10^{-4}$ | 0.1 | 5.0 MΩ | 9.1 V | 22 A | 30 kV |
| 94 | 0.3 | 2.0 | 0.3 | $1 \times 10^{-4}$ | 0.1 | 5.5 MΩ | 9.3 V | 21 A | 30 kV |
| 95 | 0.3 | 2.0 | 0.5 | $1 \times 10^{-4}$ | 0.1 | 6.0 MΩ | 8.8 V | 20 A | 30 kV |
| * 96 | 0.3 | 2.0 | 0.8 | $1 \times 10^{-4}$ | 0.1 | 6.4 MΩ | 9.0 V | 8 A | 20 kV |
| 97 | 0.05 | 2.0 | 0.005 | $1 \times 10^{-4}$ | 0.1 | 1.8 MΩ | 9.0 V | 20 A | 30 kV |
| 98 | 0.05 | 2.0 | 0.5 | $1 \times 10^{-4}$ | 0.1 | 3.5 MΩ | 8.8 V | 21 A | 30 kV |
| 99 | 3 | 2.0 | 0.005 | $1 \times 10^{-4}$ | 0.1 | 4.3 MΩ | 8.8 V | 20 A | 30 kV |
| 100 | 3 | 2.0 | 0.5 | $1 \times 10^{-4}$ | 0.1 | 5.9 MΩ | 8.7 V | 20 A | 30 kV |
| 101 | 0.3 | 0.5 | 0.5 | $1 \times 10^{-4}$ | 0.1 | 3.2 MΩ | 8.8 V | 20 A | 30 kV |
| 102 | 0.3 | 10.0 | 0.005 | $1 \times 10^{-4}$ | 0.1 | 4.1 MΩ | 8.9 V | 20 A | 30 kV |
| 103 | 0.3 | 10.0 | 0.5 | $1 \times 10^{-4}$ | 0.1 | 5.9 MΩ | 8.8 V | 20 A | 30 kV |
| 104 | 0.3 | 2.0 | 0.005 | $2 \times 10^{-5}$ | 0.1 | 2.0 MΩ | 8.8 V | 22 A | 30 kV |
| 105 | 0.3 | 2.0 | 0.005 | 0.5 | 0.1 | 1.6 MΩ | 9.1 V | 29 A | 30 kV |
| 106 | 0.3 | 2.0 | 0.5 | $2 \times 10^{-5}$ | 0.1 | 4.1 MΩ | 9.0 V | 21 A | 30 kV |
| 107 | 0.3 | 2.0 | 0.5 | 0.5 | 0.1 | 3.3 MΩ | 9.0 V | 27 A | 30 kV |
| 108 | 0.3 | 2.0 | 0.005 | $1 \times 10^{-4}$ | 0.05 | 2.5 MΩ | 8.9 V | 26 A | 30 kV |
| 109 | 0.3 | 2.0 | 0.005 | $1 \times 10^{-4}$ | 5 | 3.7 MΩ | 9.3 V | 23 A | 30 kV |
| 110 | 0.3 | 2.0 | 0.5 | $1 \times 10^{-4}$ | 0.05 | 3.9 MΩ | 8.7 V | 26 A | 30 kV |
| 111 | 0.3 | 2.0 | 0.5 | $1 \times 10^{-4}$ | 5 | 5.0 MΩ | 9.0 V | 20 A | 30 kV |

TABLE 6

| SAMPLE NO. | ADDITION ELEMENT (atom %) | | | | | | | | INITIAL IR (MΩ) | VARISTOR VOLTAGE (V) | SURGE RESISTANCE (A) | ESD RESISTANCE (kV) |
|---|---|---|---|---|---|---|---|---|---|---|---|---|
| | Pr | Co | Al | Zr | K, Na, Li TOTAL CONTENT | K | Na | Li | | | | |
| * 112 | 0.3 | 2.0 | $1 \times 10^{-4}$ | 0.1 | 0 | 0 | 0 | 0 | 0.001 | 8.7 | 30 | 30 |
| * 113 | 0.3 | 2.0 | $1 \times 10^{-4}$ | 0.1 | 0.001 | 0.0005 | 0.0005 | 0 | 0.05 | 9.1 | 28 | 30 |
| 114 | 0.3 | 2.0 | $1 \times 10^{-4}$ | 0.1 | 0.005 | 0.003 | 0.001 | 0.001 | 1.2 | 9.0 | 28 | 30 |
| 115 | 0.3 | 2.0 | $1 \times 10^{-4}$ | 0.1 | 0.01 | 0.005 | 0.002 | 0.003 | 2.5 | 9.1 | 27 | 30 |

TABLE 6-continued

| SAMPLE NO. | ADDITION ELEMENT (atom %) | | | | | | | | INITIAL IR (MΩ) | VARISTOR VOLTAGE (V) | SURGE RESIS- TANCE (A) | ESD RESIS- TANCE (kV) |
|---|---|---|---|---|---|---|---|---|---|---|---|---|
| | Pr | Co | Al | Zr | K, Na, Li TOTAL CONTENT | K | Na | Li | | | | |
| 116 | 0.3 | 2.0 | $1 \times 10^{-4}$ | 0.1 | 0.05 | 0.01 | 0.03 | 0.01 | 4.1 | 8.8 | 25 | 30 |
| 117 | 0.3 | 2.0 | $1 \times 10^{-4}$ | 0.1 | 0.08 | 0.05 | 0.02 | 0.01 | 5.2 | 8.7 | 24 | 30 |
| 118 | 0.3 | 2.0 | $1 \times 10^{-4}$ | 0.1 | 0.1 | 0.05 | 0.03 | 0.02 | 5.5 | 9.3 | 21 | 30 |
| 119 | 0.3 | 2.0 | $1 \times 10^{-4}$ | 0.1 | 0.3 | 0.1 | 0.1 | 0.1 | 5.4 | 9.1 | 20 | 30 |
| 120 | 0.3 | 2.0 | $1 \times 10^{-4}$ | 0.1 | 0.5 | 0.2 | 0.2 | 0.1 | 7.4 | 9.0 | 20 | 30 |
| * 121 | 0.3 | 2.0 | $1 \times 10^{-4}$ | 0.1 | 0.8 | 0.4 | 0.2 | 0.2 | 8.8 | 8.8 | 11 | 10 |

As apparently shown in Table 4, when the content of Na was in the range of from 0.005 to 0.5 atom percent as was the case of K, as can be seen from the results obtained from sample Nos. 65 to 71 and 73 to 87, although the varistor voltage was low, such as approximately 9 V, the initial IR was 1.0 MΩ or more, the surge resistance was 20 A or more, and the ESD resistance was 30 kV.

In addition, as can be seen from Table 5, since the Li content was in the range of from 0.005 to 0.5 atom percent in sample Nos. 89 to 95 and 97 to 111, as was the case described above, although the varistor voltage was low, such as approximately 9 V, the initial IR was 1.0 MΩ or more, the surge resistance was 20 A or more, and the ESD resistance was 30 kV.

Furthermore, as can be seen from Table 6, when K, Na, and Li were optionally combined with each other, according to sample Nos. 114 to 120 in which the total content thereof was in the range of from 0.005 to 0.5 atom percent, as was the case described above, although the varistor voltage was low, such as approximately 9 V, the initial IR was 1.0 MΩ or more, the surge resistance was 20 A or more, and the ESD resistance was 30 kV.

Accordingly, from the results shown in Tables 3 to 6, when at least one of K, Na, and Li was contained at a total content in the range of from 0.005 to 0.5 atom percent, in a multilayer varistor designed to cooperate with a circuit driven at a low voltage, such as a rated voltage of 30 V or less, it was understood that the leak current could be decreased, and a high surge resistance and a high ESD resistance could be realized. In addition, even when the varistor voltage was low, such as approximately 9 V, it was understood that very superior properties could be obtained, that is, an initial IR of 1.0 MΩ or more, a surge resistance of 20 A or more, an ESD resistance of 30 kV could be obtained.

Example 4

In Example 4, among Pr, Co, K, Al, and Zr used as a sub-component, samples in which the content of Al was primarily changed were formed, and the properties thereof were evaluated.

Except that the contents of the sub-components were changed as shown in the following Table 7, multilayer varistors were formed in the same manner as that in Example 1, and the evaluation was performed. The results are shown in Table 7 below.

TABLE 7

| SAMPLE NO. | ADDITION ELEMENT (atom %) | | | | | INITIAL IR | VARISTOR VOLTAGE | SURGE RESIS- TANCE | ESD RESIS- TANCE |
|---|---|---|---|---|---|---|---|---|---|
| | Pr | Co | K | Al | Zr | | | | |
| * 122 | 0.3 | 2 | 0.05 | 0 | 0.1 | 12 MΩ | 9.0 V | 8 A | 5 kV |
| * 123 | 0.3 | 2 | 0.05 | $1 \times 10^{-5}$ | 0.1 | 8 MΩ | 9.1 V | 15 A | 15 kV |
| 124 | 0.3 | 2 | 0.05 | $2 \times 10^{-5}$ | 0.1 | 4.2 MΩ | 8.8 V | 20 A | 30 kV |
| 125 | 0.3 | 2 | 0.05 | $1 \times 10^{-4}$ | 0.1 | 1.8 MΩ | 8.7 V | 25 A | 30 kV |
| 126 | 0.3 | 2 | 0.05 | $5 \times 10^{-4}$ | 0.1 | 1.7 MΩ | 9.3 V | 27 A | 30 kV |
| 127 | 0.3 | 2 | 0.05 | $1 \times 10^{-3}$ | 0.1 | 1.3 MΩ | 9.0 V | 28 A | 30 kV |
| 128 | 0.3 | 2 | 0.05 | $5 \times 10^{-3}$ | 0.1 | 1.2 MΩ | 9.1 V | 30 A | 30 kV |
| 129 | 0.3 | 2 | 0.05 | $1 \times 10^{-2}$ | 0.1 | 1.0 MΩ | 9.1 V | 31 A | 30 kV |
| 130 | 0.3 | 2 | 0.05 | $5 \times 10^{-2}$ | 0.1 | 1.0 MΩ | 9.3 V | 33 A | 30 kV |
| 131 | 0.3 | 2 | 0.05 | 0.5 | 0.1 | 1.0 MΩ | 9.6 V | 34 A | 30 kV |
| * 132 | 0.3 | 2 | 0.05 | 1 | 0.1 | 0.05 MΩ | 8.8 V | 34 A | 30 kV |
| 133 | 0.3 | 2 | 0.05 | $5 \times 10^{-5}$ | 0.05 | 4.1 MΩ | 8.7 V | 20 A | 30 kV |
| 134 | 0.3 | 2 | 0.05 | $5 \times 10^{-5}$ | 5 | 5.5 MΩ | 9.0 V | 26 A | 30 kV |
| 135 | 0.3 | 2 | 0.05 | 0.5 | 0.05 | 1.0 MΩ | 9.5 V | 31 A | 30 kV |
| 136 | 0.3 | 2 | 0.05 | 0.5 | 5 | 5.4 MΩ | 9.0 V | 26 A | 30 kV |

As can be seen from Table 7, according to sample Nos. 122 and 123, since the Al content was less than $2 \times 10^{-5}$ atom percent, although the initial IR was high, the surge resistance and the ESD resistance were low, and according to sample No. 132, since the Al content was more than 0.5 atom percent, although the surge resistance and the ESD resistance were high, the initial IR was extremely low.

On the other hand, according to sample Nos. 124 to 131 and 133 to 136, since the Al content was set in the range of from $2 \times 10^{-5}$ to 0.5 atom percent in accordance with the present invention, although the varistor voltage was low, such as approximately 9 V, the initial IR was 1.0 MΩ or more, the surge resistance was 20 A or more, and the ESD resistance was 30 kV.

Accordingly, since the content of Al was set in the range of from $2 \times 10^{-5}$ to 0.5 atom percent, in a multilayer varistor designed to cooperate with a circuit driven at a low voltage, such as a rated voltage of 30 V or less, it was understood that the leak current could be decreased, and a high surge resistance and a high ESD resistance could be realized.

Subsequently, instead of Al, samples containing Ga or In, and samples in which Al, Ga, and Li were optionally combined with each other were used for forming multilayer varistors in the same manner as that in Example 1 described above, and the evaluation thereof was then performed. The compositions of the sub-components and the evaluation results are shown in Tables 8 to 10.

TABLE 8

| SAMPLE NO. | ADDITION ELEMENT (atom %) | | | | | INITIAL IR | VARISTOR VOLTAGE | SURGE RESISTANCE | ESD RESISTANCE |
|---|---|---|---|---|---|---|---|---|---|
| | Pr | Co | K | Ga | Zr | | | | |
| * 137 | 0.3 | 2 | 0.05 | $1 \times 10^{-6}$ | 0.1 | 9.2 MΩ | 8.8 V | 12 A | 20 kV |
| 138 | 0.3 | 2 | 0.05 | $2 \times 10^{-5}$ | 0.1 | 5.3 MΩ | 9.0 V | 20 A | 30 kV |
| 139 | 0.3 | 2 | 0.05 | $1 \times 10^{-4}$ | 0.1 | 2.5 MΩ | 9.1 V | 21 A | 30 kV |
| 140 | 0.3 | 2 | 0.05 | $1 \times 10^{-3}$ | 0.1 | 2.1 MΩ | 9.1 V | 25 A | 30 kV |
| 141 | 0.3 | 2 | 0.05 | $1 \times 10^{-2}$ | 0.1 | 1.5 MΩ | 8.9 V | 27 A | 30 kV |
| 142 | 0.3 | 2 | 0.05 | $5 \times 10^{-2}$ | 0.1 | 1.1 MΩ | 9.3 V | 27 A | 30 kV |
| 143 | 0.3 | 2 | 0.05 | 0.5 | 0.1 | 1.1 MΩ | 9.2 V | 28 A | 30 kV |
| * 144 | 0.3 | 2 | 0.05 | 1 | 0.1 | 0.5 MΩ | 8.9 V | 28 A | 30 kV |
| 145 | 0.05 | 2 | 0.05 | $2 \times 10^{-5}$ | 0.1 | 3.5 MΩ | 9.1 V | 22 A | 30 kV |
| 146 | 3 | 2 | 0.05 | $2 \times 10^{-5}$ | 0.1 | 5.4 MΩ | 8.9 V | 21 A | 30 kV |
| 147 | 3 | 2 | 0.05 | 0.5 | 0.1 | 1.6 MΩ | 9.0 V | 25 A | 30 kV |
| 148 | 0.3 | 0.5 | 0.05 | $2 \times 10^{-5}$ | 0.1 | 1.5 MΩ | 9.3 V | 20 A | 30 kV |
| 149 | 0.3 | 10 | 0.05 | $2 \times 10^{-5}$ | 0.1 | 4.9 MΩ | 9.0 V | 21 A | 30 kV |
| 150 | 0.3 | 10 | 0.05 | 0.5 | 0.1 | 2.5 MΩ | 9.1 V | 28 A | 30 kV |
| 151 | 0.3 | 2 | 0.005 | $2 \times 10^{-5}$ | 0.1 | 1.9 MΩ | 9.0 V | 24 A | 30 kV |
| 152 | 0.3 | 2 | 0.5 | $2 \times 10^{-5}$ | 0.1 | 1.3 MΩ | 9.2 V | 30 A | 30 kV |
| 153 | 0.3 | 2 | 0.005 | 0.5 | 0.1 | 3.5 MΩ | 9.0 V | 20 A | 30 kV |
| 154 | 0.3 | 2 | 0.5 | 0.5 | 0.1 | 2.9 MΩ | 8.9 V | 27 A | 30 kV |
| 155 | 0.3 | 2 | 0.05 | $2 \times 10^{-5}$ | 0.05 | 4.6 MΩ | 8.8 V | 21 A | 30 kV |
| 156 | 0.3 | 2 | 0.05 | $2 \times 10^{-5}$ | 5 | 5.5 MΩ | 8.9 V | 25 A | 30 kV |
| 157 | 0.3 | 2 | 0.05 | 0.5 | 0.05 | 1.2 MΩ | 9.3 V | 28 A | 30 kV |
| 158 | 0.3 | 2 | 0.05 | 0.5 | 5 | 5.5 MΩ | 9.1 V | 24 A | 30 kV |

TABLE 9

| SAMPLE NO. | ADDITION ELEMENT (atom %) | | | | | INITIAL IR | VARISTOR VOLTAGE | SURGE RESISTANCE | ESD RESISTANCE |
|---|---|---|---|---|---|---|---|---|---|
| | Pr | Co | K | In | Zr | | | | |
| * 159 | 0.3 | 2 | 0.05 | $1 \times 10^{-6}$ | 0.1 | 9.2 MΩ | 9.1 V | 11 A | 15 kV |
| 160 | 0.3 | 2 | 0.05 | $2 \times 10^{-5}$ | 0.1 | 5.3 MΩ | 9.0 V | 20 A | 30 kV |
| 161 | 0.3 | 2 | 0.05 | $1 \times 10^{-4}$ | 0.1 | 2.5 MΩ | 8.8 V | 20 A | 30 kV |
| 162 | 0.3 | 2 | 0.05 | $1 \times 10^{-3}$ | 0.1 | 2.1 MΩ | 8.9 V | 24 A | 30 kV |
| 163 | 0.3 | 2 | 0.05 | $1 \times 10^{-2}$ | 0.1 | 1.5 MΩ | 8.7 V | 26 A | 30 kV |
| 164 | 0.3 | 2 | 0.05 | $5 \times 10^{-2}$ | 0.1 | 1.1 MΩ | 9.2 V | 28 A | 30 kV |
| 165 | 0.3 | 2 | 0.05 | 0.5 | 0.1 | 1.0 MΩ | 9.0 V | 28 A | 30 kV |
| * 166 | 0.3 | 2 | 0.05 | 1 | 0.1 | 0.3 MΩ | 9.0 V | 27 A | 30 kV |
| 167 | 0.05 | 2 | 0.05 | $2 \times 10^{-5}$ | 0.1 | 4.0 MΩ | 9.1 V | 21 A | 30 kV |
| 168 | 3 | 2 | 0.05 | $2 \times 10^{-5}$ | 0.1 | 5.5 MΩ | 9.1 V | 22 A | 30 kV |
| 169 | 3 | 2 | 0.05 | 0.5 | 0.1 | 1.9 MΩ | 9.0 V | 26 A | 30 kV |
| 170 | 0.3 | 0.5 | 0.05 | $2 \times 10^{-5}$ | 0.1 | 2.0 MΩ | 9.2 V | 20 A | 30 kV |
| 171 | 0.3 | 10 | 0.05 | $2 \times 10^{-5}$ | 0.1 | 4.8 MΩ | 8.9 V | 22 A | 30 kV |
| 172 | 0.3 | 10 | 0.05 | 0.5 | 0.1 | 2.6 MΩ | 9.0 V | 29 A | 30 kV |
| 173 | 0.3 | 2 | 0.005 | $2 \times 10^{-5}$ | 0.1 | 2.1 MΩ | 8.8 V | 23 A | 30 kV |
| 174 | 0.3 | 2 | 0.5 | $2 \times 10^{-5}$ | 0.1 | 1.2 MΩ | 9.0 V | 27 A | 30 kV |
| 175 | 0.3 | 2 | 0.005 | 0.5 | 0.1 | 3.5 MΩ | 9.1 V | 21 A | 30 kV |
| 176 | 0.3 | 2 | 0.5 | 0.5 | 0.1 | 2.7 MΩ | 8.8 V | 26 A | 30 kV |
| 177 | 0.3 | 2 | 0.05 | $2 \times 10^{-5}$ | 0.05 | 4.5 MΩ | 8.8 V | 22 A | 30 kV |
| 178 | 0.3 | 2 | 0.05 | $2 \times 10^{-5}$ | 5 | 5.4 MΩ | 8.9 V | 25 A | 30 kV |
| 179 | 0.3 | 2 | 0.05 | 0.5 | 0.05 | 1.1 MΩ | 9.3 V | 26 A | 30 kV |
| 180 | 0.3 | 2 | 0.05 | 0.5 | 5 | 5.9 MΩ | 9.1 V | 23 A | 30 kV |

TABLE 10

| SAMPLE NO. | Pr | Co | K | Zr | Al, Ga, In TOTAL CONTENT | Al | Ga | In | INITIAL IR (MΩ) | VARISTOR VOLTAGE (V) | SURGE RESISTANCE (A) | ESD RESISTANCE (kV) |
|---|---|---|---|---|---|---|---|---|---|---|---|---|
| * 181 | 0.3 | 2.0 | 0.05 | 0.1 | 0 | 0 | 0 | 0 | 12 | 9.0 | 8 | 5 |
| * 182 | 0.3 | 2.0 | 0.05 | 0.1 | $1 \times 10^{-5}$ | $5 \times 10^{-6}$ | $2.5 \times 10^{-6}$ | $2.5 \times 10^{-6}$ | 5.2 | 9.1 | 12 | 15 |
| 183 | 0.3 | 2.0 | 0.05 | 0.1 | $5 \times 10^{-5}$ | $3 \times 10^{-5}$ | $1 \times 10^{-5}$ | $1 \times 10^{-5}$ | 4.3 | 9.0 | 20 | 30 |
| 184 | 0.3 | 2.0 | 0.05 | 0.1 | $1 \times 10^{-4}$ | $2 \times 10^{-5}$ | $4 \times 10^{-5}$ | $4 \times 10^{-4}$ | 4.1 | 9.1 | 22 | 30 |
| 185 | 0.3 | 2.0 | 0.05 | 0.1 | $1 \times 10^{-3}$ | $5 \times 10^{-4}$ | $3 \times 10^{-4}$ | $2 \times 10^{-4}$ | 3.0 | 8.7 | 23 | 30 |
| 186 | 0.3 | 2.0 | 0.05 | 0.1 | $1 \times 10^{-2}$ | $5 \times 10^{-3}$ | $1 \times 10^{-3}$ | $4 \times 10^{-3}$ | 2.1 | 9.1 | 25 | 30 |
| 187 | 0.3 | 2.0 | 0.05 | 0.1 | $5 \times 10^{-2}$ | 0 | $3 \times 10^{-2}$ | $2 \times 10^{-2}$ | 1.2 | 9.0 | 28 | 30 |
| 188 | 0.3 | 2.0 | 0.05 | 0.1 | 0.5 | 0.3 | 0.1 | 0.1 | 1.1 | 9.3 | 29 | 30 |
| * 189 | 0.3 | 2.0 | 0.05 | 0.1 | 1 | 0.5 | 0.3 | 0.2 | 0.4 | 9.2 | 29 | 30 |

As can be seen from Table 8, in the samples containing Ga instead of Al, when the content of Ga was set in the range of from $2 \times 10^{-5}$ to 0.5 atom percent (sample Nos. 138 to 143 and 145 to 158), although the varistor voltage was low, such as approximately 9 V, the superior properties could be obtained, that is, the initial insulation resistance IR was 1.0 MΩ or more, the surge resistance was 20 A or more, and the ESD resistance was 30 kV.

As can be seen from Table 9, instead of Al and Ga, when the content of In was set in the range of from $2 \times 10^{-5}$ to 0.5 atom percent (sample Nos. 160 to 165 and 167 to 180), as was the case described above, although the varistor voltage was low, such as approximately 9 V, the initial IR was 1.0 MΩ or more, the surge resistance was 20 A or more, and the ESD resistance was 30 kV.

Furthermore, as can be seen from Table 10, in the case in which Al, Ga, and In were optionally combined with each other, when the total content was set in the range of from $2 \times 10^{-5}$ to 0.5 atom percent (sample Nos. 183 to 188), as was the case described above, although the varistor voltage was low, such as approximately 9 V, the initial IR was 1.0 MΩ or more, the surge resistance was 20 A or more, and the ESD resistance was 30 kV.

From the results shown in Tables 7 to 10, when at least one of Al, Ga, and In was contained at a total content in the range of from $2 \times 10^{-5}$ to 0.5 atom percent, in a multilayer varistor designed to cooperate with a circuit driven at a low voltage, such as a rated voltage of 30 V or less, the leak current could be decreased, and a high surge resistance and a high ESD resistance could be realized. In addition, when the varistor voltage was low, such as approximately 9 V, an initial IR of 1.0 MΩ or more, a surge resistance of 20 A or more, an ESD resistance of 30 kV could be obtained.

Example 5

While the contents of Pr, Co, K, and Al used as a sub-component were fixed constant, the content of Zr was changed. Green sheets having compositions of composition Nos. 1 to 13 shown in Table 11 were used. Multilayer varistors were formed in the same manner as that in Example 1 except that the thicknesses of the green sheets were adjusted to be 25, 35, and 42 μm before firing, and that the varistor voltages were set to approximately 9, 12, and 27 V, and subsequently, the evaluation was performed. The results are shown in Table 12 below.

TABLE 11

| COMPOSITION NO. | Pr | Co | K | Al | Zr |
|---|---|---|---|---|---|
| * 1 | 0.3 | 2 | 0.05 | $1 \times 10^{-4}$ | 0.000001 |
| * 2 | 0.3 | 2 | 0.05 | $1 \times 10^{-4}$ | 0.0001 |
| * 3 | 0.3 | 2 | 0.05 | $1 \times 10^{-4}$ | 0.001 |
| 4 | 0.3 | 2 | 0.05 | $1 \times 10^{-4}$ | 0.005 |
| 5 | 0.3 | 2 | 0.05 | $1 \times 10^{-4}$ | 0.01 |
| 6 | 0.3 | 2 | 0.05 | $1 \times 10^{-4}$ | 0.05 |
| 7 | 0.3 | 2 | 0.05 | $1 \times 10^{-4}$ | 0.1 |
| 8 | 0.3 | 2 | 0.05 | $1 \times 10^{-4}$ | 1 |
| 9 | 0.3 | 2 | 0.05 | $1 \times 10^{-4}$ | 3 |
| 10 | 0.3 | 2 | 0.05 | $1 \times 10^{-4}$ | 5 |
| * 11 | 0.3 | 2 | 0.05 | $1 \times 10^{-4}$ | 6 |
| * 12 | 0.3 | 2 | 0.05 | $1 \times 10^{-4}$ | 8 |
| * 13 | 0.3 | 2 | 0.05 | $1 \times 10^{-4}$ | 10 |

TABLE 12

| SAMPLE NO. | COMPOSITION NO. | THICKNESS OF CHARACTERISTIC LAYER | INITIAL IR | VARISTOR VOLTAGE | SURGE RESISTANCE | ESD RESISTANCE |
|---|---|---|---|---|---|---|
| * 190 | 1 | 25 μm | 0.8 MΩ | 8.8 V | 18 A | 2 kV |
| * 191 | 2 | 25 μm | 1.2 MΩ | 8.9 V | 19 A | 2 kV |
| * 192 | 3 | 25 μm | 1.3 MΩ | 9.1 V | 20 A | 5 kV |
| 193 | 4 | 25 μm | 1.5 MΩ | 9.4 V | 21 A | 15 kV |
| 194 | 5 | 25 μm | 1.8 MΩ | 9.4 V | 25 A | 15 kV |
| 195 | 6 | 25 μm | 1.7 MΩ | 9.1 V | 24 A | 30 kV |
| 196 | 7 | 25 μm | 1.8 MΩ | 9.4 V | 25 A | 30 kV |
| 197 | 8 | 25 μm | 1.6 MΩ | 8.7 V | 22 A | 30 kV |

TABLE 12-continued

| SAMPLE NO. | COMPOSITION NO. | THICKNESS OF CHARACTERISTIC LAYER | INITIAL IR | VARISTOR VOLTAGE | SURGE RESISTANCE | ESD RESISTANCE |
|---|---|---|---|---|---|---|
| 198 | 9 | 25 μm | 2.0 MΩ | 8.8 V | 22 A | 30 kV |
| 199 | 10 | 25 μm | 3.0 MΩ | 9.1 V | 20 A | 30 kV |
| *200 | 11 | 25 μm | 3.2 MΩ | 8.8 V | 16 A | 20 kV |
| *201 | 12 | 25 μm | 3.3 MΩ | 9.1 V | 15 A | 10 kV |
| *202 | 13 | 25 μm | 4.2 MΩ | 9.4 V | 12 A | 2 kV |
| *203 | 1 | 35 μm | 10 MΩ | 11.7 V | 25 A | 5 kV |
| *204 | 2 | 35 μm | 20 MΩ | 12.2 V | 25 A | 8 kV |
| *205 | 3 | 35 μm | 22 MΩ | 12.0 V | 30 A | 15 kV |
| 206 | 4 | 35 μm | 30 MΩ | 12.2 V | 31 A | 20 kV |
| 207 | 5 | 35 μm | 32 MΩ | 12.2 V | 33 A | 30 kV |
| 208 | 6 | 35 μm | 30 MΩ | 12.0 V | 35 A | 30 kV |
| 209 | 7 | 35 μm | 30 MΩ | 12.5 V | 35 A | 30 kV |
| 210 | 8 | 35 μm | 31 MΩ | 11.5 V | 33 A | 30 kV |
| 211 | 9 | 35 μm | 38 MΩ | 12.1 V | 33 A | 30 kV |
| 212 | 10 | 35 μm | 41 MΩ | 12.1 V | 30 A | 30 kV |
| *213 | 11 | 35 μm | 44 MΩ | 12.1 V | 27 A | 20 kV |
| *214 | 12 | 35 μm | 45 MΩ | 11.9 V | 22 A | 15 kV |
| *215 | 13 | 35 μm | 54 MΩ | 12.5 V | 21 A | 5 kV |
| *216 | 1 | 42 μm | 33 MΩ | 26 V | 46 A | 5 kV |
| *217 | 2 | 42 μm | 41 MΩ | 27.8 V | 46 A | 15 kV |
| *218 | 3 | 42 μm | 50 MΩ | 26.4 V | 50 A | 20 kV |
| 219 | 4 | 42 μm | 58 MΩ | 27.9 V | 53 A | 30 kV |
| 220 | 5 | 42 μm | 59 MΩ | 27.1 V | 53 A | 30 kV |
| 221 | 6 | 42 μm | 58 MΩ | 27.1 V | 54 A | 30 kV |
| 222 | 7 | 42 μm | 61 MΩ | 27.4 V | 62 A | 30 kV |
| 223 | 8 | 42 μm | 64 MΩ | 27.1 V | 59 A | 30 kV |
| 224 | 9 | 42 μm | 70 MΩ | 27.3 V | 55 A | 30 kV |
| 225 | 10 | 42 μm | 88 MΩ | 26.7 V | 51 A | 30 kV |
| *226 | 11 | 42 μm | 85 MΩ | 27.1 V | 47 A | 20 kV |
| *227 | 12 | 42 μm | 82 MΩ | 27.5 V | 41 A | 20 kV |
| *228 | 13 | 42 μm | 100 MΩ | 27.9 V | 28 A | 5 kV |

As can be seen from Table 12, according to sample Nos. 219 to 225 of the present invention among the samples using a ceramic green sheet 42 μm thick, the varistor voltage $V_{1mA}$ was in the range of from 26 to 28 V, and a circuit driven at a low voltage, such as a rated voltage of 30 V or less, could be used; however, the initial IR was high, such as 50 MΩ or more. In addition, the surge resistance was 50 A or more, and the ESD resistance was 30 kV. Hence, it was understood that very superior properties could be obtained.

On the other hand, according to sample Nos. 216, 217, 218, and 226 to 228 having a Zr content outside the range of from 0.005 to 5.0 atom percent, the ESD resistance was 20 kV or less. Accordingly, when the Zr content was set in the range of from 0.005 to 5.0 atom percent, in a multilayer varistor designed to cooperate with a circuit driven at a low voltage, such as a rated voltage of 30 V or less, it was understood that the leak current could be decreased, and a high surge resistance and a high ESD resistance could be realized.

In addition, as can be seen from the results of sample Nos. 193 to 199 and 206 to 212, in order to cooperate with a circuit driven at a lower voltage, even when samples of green sheets 35 and 25 μm thick were used so as to obtain a varistor voltage of 12 V or 9 V, it was understood that a multilayer varistor having a high initial IR and high ESD resistance could be obtained by the addition of Zr. However, when the content of Zr was 0.01 atom percent or less at a varistor voltage of 12 V, and when the content of Zr was 0.05 atom percent or less at a varistor voltage of 9 V, the surge resistance and the ESD resistance were liable to decrease.

Figure 5:
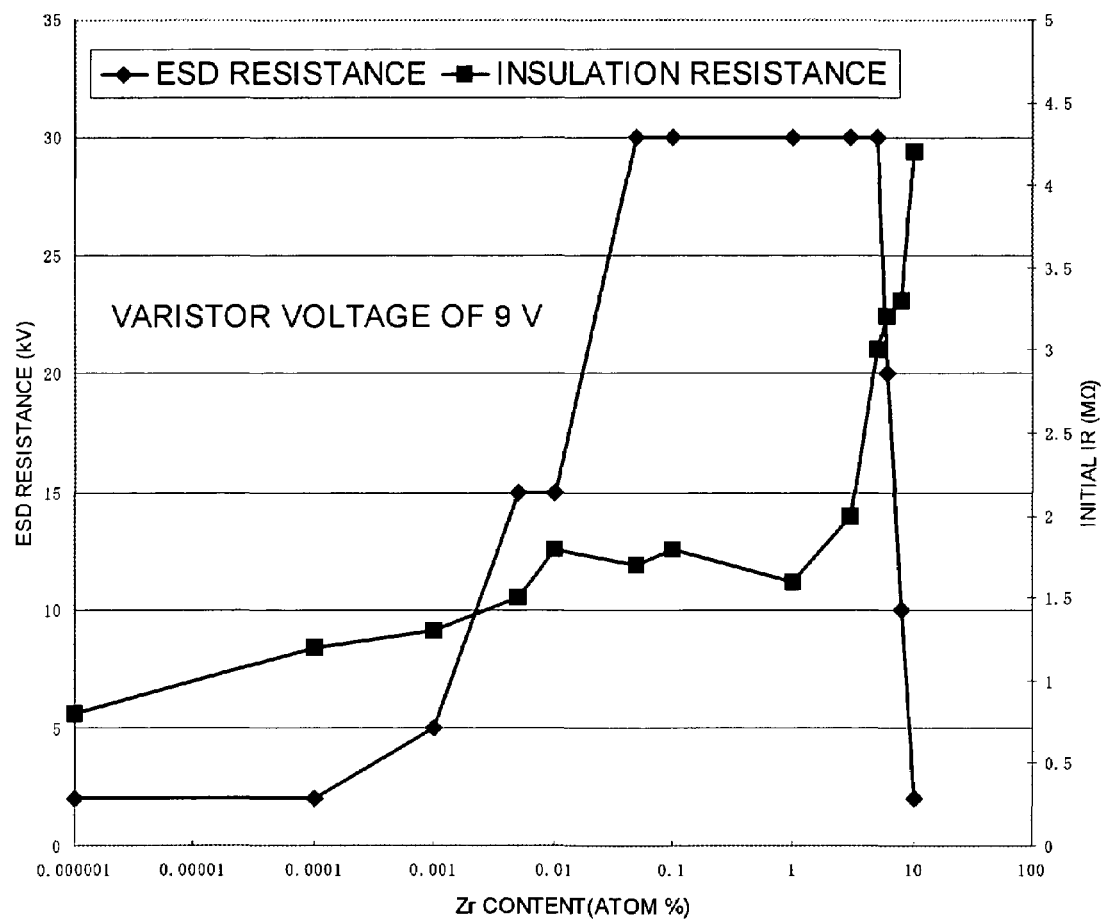
FIG. 5 is a graph showing the relationship of the Zr content with the ESD resistance and the initial insulation resistance of a varistor at a varistor voltage of 9 V.
Figure 6:
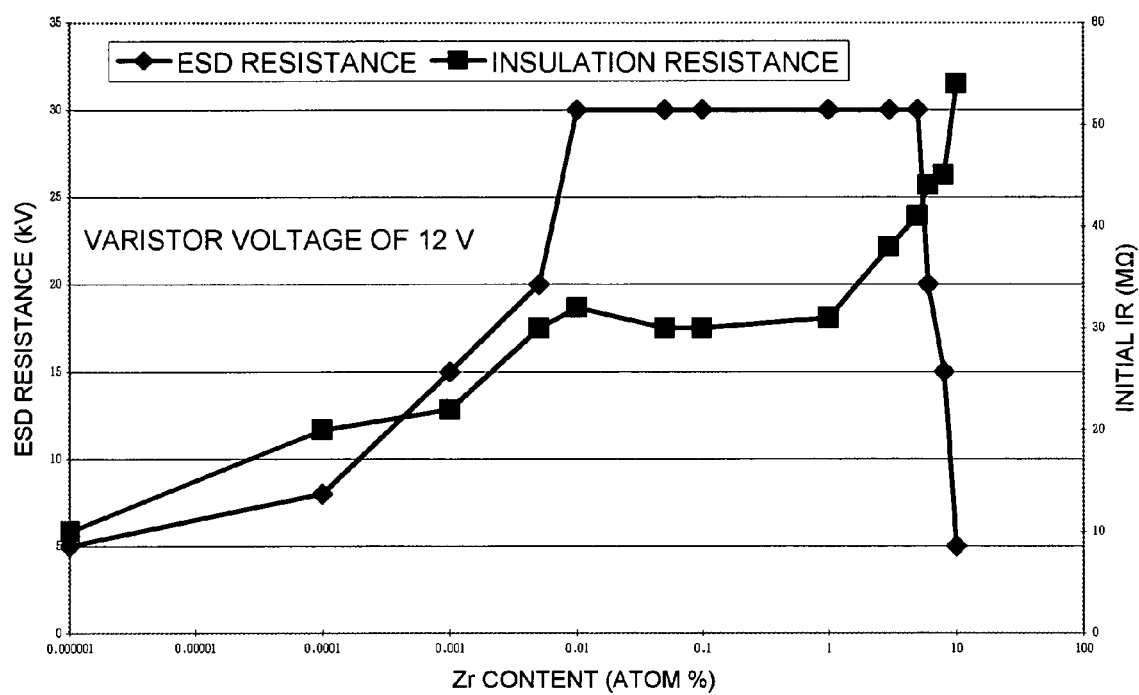
FIG. 6 is a graph showing the relationship of the Zr content with the ESD resistance and the initial insulation resistance of a varistor at a varistor voltage of 12 V.
Figure 7:
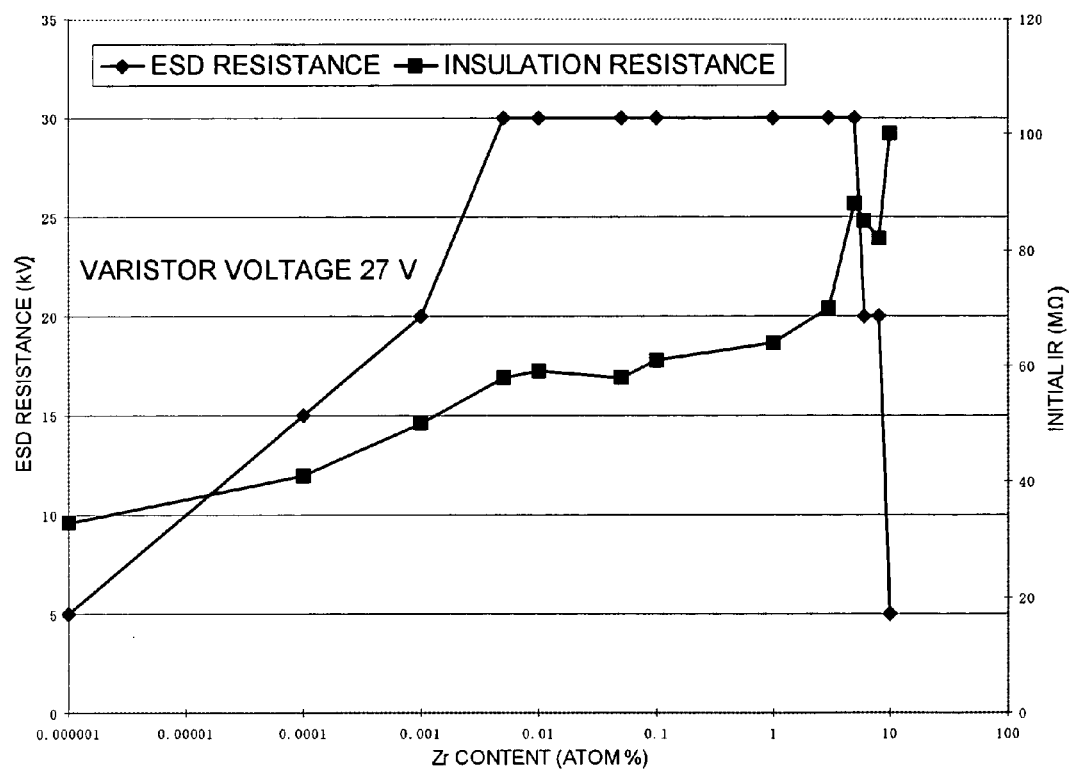
FIG. 7 is a graph showing the relationship of the Zr content with the ESD resistance and the initial insulation resistance of a varistor at a varistor voltage of 27 V.

FIGS. 5 to 7 are graphs each showing the relationship of the initial IR and the ESD resistance with respect to the Zr content of the individual samples at varistor voltages of 9, 12, and 27 V. As can be seen from Table 12 and FIGS. 5 to 7, when an appropriate amount of Zr was added to a composition containing ZnO as a primary component, Pr, Co, Al, and K, it was understood that the initial IR and the ESD resistance of a multilayer varistor designed to cooperate with a low voltage drive circuit could be simultaneously improved.

Example 6

In Example 6, among Pr, Co, K, Al, and Zr used as a sub-component, samples in which the contents of Co and Al were primarily changed were formed, and the properties thereof were evaluated.

Except that the contents of the sub-components were changed as shown in the following Table 13, multilayer varistors were formed in the same manner as that in Example 1, and the evaluation was performed. The results are shown in Table 13 below.

TABLE 13

| SAMPLE NO. | ADDITION ELEMENT (atom %) | | | | | INITIAL IR | VARISTOR VOLTAGE | SURGE RESISTANCE | ESD RESISTANCE |
|---|---|---|---|---|---|---|---|---|---|
| | Pr | Co | K | Al | Zr | Co/Al | | | |
| 229 | 0.3 | 2 | 0.05 | $2 \times 10^{-5}$ | 0.1 | 100000 | 4.2 MΩ | 8.8 V | 20 A | 30 kV |
| 230 | 0.3 | 2 | 0.05 | $1 \times 10^{-4}$ | 0.1 | 20000 | 1.8 MΩ | 8.7 V | 25 A | 30 kV |
| 231 | 0.3 | 2 | 0.05 | $5 \times 10^{-4}$ | 0.1 | 4000 | 1.7 MΩ | 9.3 V | 27 A | 30 kV |
| 232 | 0.3 | 2 | 0.05 | $1 \times 10^{-3}$ | 0.1 | 2000 | 1.3 MΩ | 9.0 V | 28 A | 30 kV |
| 233 | 0.3 | 2 | 0.05 | $5 \times 10^{-3}$ | 0.1 | 400 | 1.2 MΩ | 9.1 V | 30 A | 30 kV |
| 234 | 0.3 | 2 | 0.05 | $1 \times 10^{-2}$ | 0.1 | 200 | 1.0 MΩ | 9.1 V | 31 A | 30 kV |
| 235 | 0.3 | 2 | 0.05 | $5 \times 10^{-2}$ | 0.1 | 40 | 1.0 MΩ | 9.3 V | 33 A | 30 kV |
| 236 | 0.3 | 2 | 0.05 | 0.5 | 0.1 | 4 | 1.0 MΩ | 9.6 V | 34 A | 30 kV |
| 237 | 0.3 | 2.5 | 0.05 | $2 \times 10^{-5}$ | 0.1 | 125000 | 4.3 MΩ | 9.3 V | 20 A | 30 kV |
| 238 | 0.3 | 2.5 | 0.05 | $1 \times 10^{-3}$ | 0.1 | 2500 | 2.9 MΩ | 9.1 V | 26 A | 30 kV |
| 239 | 0.3 | 2.5 | 0.05 | $1 \times 10^{-2}$ | 0.1 | 250 | 2.6 MΩ | 8.8 V | 28 A | 30 kV |
| 240 | 0.3 | 2.5 | 0.05 | 0.05 | 0.1 | 50 | 2.6 MΩ | 9.0 V | 30 A | 30 kV |
| 241 | 0.3 | 2.5 | 0.05 | 0.1 | 0.1 | 25 | 2.3 MΩ | 9.2 V | 30 A | 30 kV |
| 242 | 0.3 | 2.5 | 0.05 | 0.5 | 0.1 | 5 | 1.9 MΩ | 8.8 V | 31 A | 30 kV |
| 243 | 0.3 | 3 | 0.05 | $2 \times 10^{-5}$ | 0.1 | 150000 | 4.5 MΩ | 8.9 V | 23 A | 30 kV |
| 244 | 0.3 | 3 | 0.05 | $1 \times 10^{-3}$ | 0.1 | 3000 | 3.0 MΩ | 8.9 V | 25 A | 30 kV |
| 245 | 0.3 | 3 | 0.05 | $1 \times 10^{-2}$ | 0.1 | 300 | 2.8 MΩ | 9.0 V | 28 A | 30 kV |
| 246 | 0.3 | 3 | 0.05 | 0.05 | 0.1 | 60 | 2.3 MΩ | 9.0 V | 27 A | 30 kV |
| 247 | 0.3 | 3 | 0.05 | 0.1 | 0.1 | 30 | 2.4 MΩ | 9.1 V | 30 A | 30 kV |
| 248 | 0.3 | 3 | 0.05 | 0.5 | 0.1 | 6 | 1.7 MΩ | 9.0 V | 31 A | 30 kV |
| 249 | 0.3 | 5 | 0.05 | $1 \times 10^{-4}$ | 0.1 | 50000 | 2.7 MΩ | 9.2 V | 21 A | 30 kV |
| 250 | 0.3 | 5 | 0.05 | $1 \times 10^{-3}$ | 0.1 | 5000 | 2.6 MΩ | 8.9 V | 24 A | 30 kV |
| 251 | 0.3 | 5 | 0.05 | $1 \times 10^{-2}$ | 0.1 | 500 | 2.6 MΩ | 8.7 V | 26 A | 30 kV |
| 252 | 0.3 | 5 | 0.05 | 0.05 | 0.1 | 100 | 2.5 MΩ | 8.8 V | 29 A | 30 kV |
| 253 | 0.3 | 5 | 0.05 | 0.1 | 0.1 | 50 | 2.2 MΩ | 8.8 V | 31 A | 30 kV |
| 254 | 0.3 | 5 | 0.05 | 0.5 | 0.1 | 10 | 1.9 MΩ | 8.9 V | 32 A | 30 kV |
| 255 | 0.3 | 10 | 0.05 | $1 \times 10^{-4}$ | 0.1 | 100000 | 4.1 MΩ | 8.9 V | 20 A | 30 kV |
| 256 | 0.3 | 10 | 0.05 | $1 \times 10^{-3}$ | 0.1 | 10000 | 4.0 MΩ | 8.8 V | 24 A | 30 kV |
| 257 | 0.3 | 10 | 0.05 | $1 \times 10^{-2}$ | 0.1 | 1000 | 3.8 MΩ | 9.1 V | 26 A | 30 kV |
| 258 | 0.3 | 10 | 0.05 | 0.05 | 0.1 | 200 | 3.7 MΩ | 9.2 V | 29 A | 30 kV |
| 259 | 0.3 | 10 | 0.05 | 0.1 | 0.1 | 100 | 3.6 MΩ | 8.7 V | 30 A | 30 kV |
| 260 | 0.3 | 10 | 0.05 | 0.5 | 0.1 | 20 | 3.0 MΩ | 8.9 V | 29 A | 30 kV |

As can be seen from Table 13, although the contents of Co and Al were simultaneously changed, when the changes were within the range of the present invention, the initial IR was 1.0 MΩ or more, the surge resistance was 20 A or more, and the ESD resistance was 30 KV.

In particular, when the content of Co was set in the range of from 2.5 to 10 atom percent, and the ratio of Co to Al was set so that Co/Al=20 to 3,000 was satisfied, it was understood that more superior properties could be obtained, that is, an initial IR of 2.0 M0 MΩ or more and a surge resistance of 25 A or more could be obtained.

In the example, the contents of Co and Al were simultaneously changed; however, instead of Al, when Ga, In, or mixture of Al, Ga, and In was added, the same effect as described above could be obtained.

As described above, it is understood that a varistor, which can decrease the leak current, can realize a high ESD resistance, and can be driven at a low voltage, is obtained when ZnO is used as a primary component, and Pr, Co, K, Al, and Zr are used as sub-components. It is also understood that when any one of the sub-components, Pr, Co, K, Al, and Zr, is not used, a varistor cannot be obtained which can decrease the leak current, can realize a high ESD resistance, and can be driven at a low voltage. In addition, from the results shown in Tables 1 to 10, 12, and 13, when a ceramic composition is used containing ZnO as a primary component and sub-components which includes Pr at a content of 0.05 to 3.0 atomic percent of the total, Co at a content of 0.5 to 5.0 atom percent of the total, at least one of K, Na, and Li at a total content of 0.005 to 0.5 atom percent of the total, at least one of Al, Ga, and In at a total content of $2 \times 10^{-5}$ to 0.5 atom percent of the total, and Zr at a content of 0.005 to 5.0 atom percent of the total, it is understood that a varistor can be obtained which can decrease the leak current, can realize a high ESD resistance, and can be driven at a low voltage.

In addition to the ZnO used as a primary component and to the various elements used as a sub-component, at least one type of element may also be used. Subsequently, this case will be described as Example 7.

Example 7

Except that the contents of Pr, Co, K, Al, and Zr were fixed constant, and that at least one of Ca, Sr, and Ba was contained as shown in the following Table 14, multilayer varistors were formed in the same manner as that in Example 1, and the evaluation was performed. The results are shown in Table 14 below.

TABLE 14

| SAMPLE NO. | ADDITION ELEMENT (atom %) | | | | | | | | INITIAL IR (MΩ) | VARISTOR VOLTAGE (V) | SURGE RESISTANCE (A) | ESD RESISTANCE (kV) |
|---|---|---|---|---|---|---|---|---|---|---|---|---|
| | Pr | Co | K | Al | Zr | Ca | Sr | Ba | | | | |
| 261 | 0.3 | 2.0 | 0.05 | $1 \times 10^{-4}$ | 0.1 | — | — | — | 1.8 | 9.4 | 25 | 30 |
| 262 | 0.3 | 2.0 | 0.05 | $1 \times 10^{-4}$ | — | — | — | — | 0.8 | 8.8 | 18 | 2 |
| 263 | 0.3 | 2.0 | 0.05 | $1 \times 10^{-4}$ | 0.1 | 0.001 | — | — | 2.2 | 8.8 | 25 | 30 |
| 264 | 0.3 | 2.0 | 0.05 | $1 \times 10^{-4}$ | 0.1 | 0.01 | — | — | 2.5 | 8.7 | 25 | 30 |
| 265 | 0.3 | 2.0 | 0.05 | $1 \times 10^{-4}$ | 0.1 | 0.05 | — | — | 2.9 | 9.3 | 24 | 30 |
| 266 | 0.3 | 2.0 | 0.05 | $1 \times 10^{-4}$ | 0.1 | 0.1 | — | — | 3.1 | 9.0 | 25 | 30 |
| 267 | 0.3 | 2.0 | 0.05 | $1 \times 10^{-4}$ | 0.1 | 0.3 | — | — | 3.2 | 9.1 | 26 | 30 |
| 268 | 0.3 | 2.0 | 0.05 | $1 \times 10^{-4}$ | 0.1 | 0.5 | — | — | 3.7 | 9.1 | 24 | 30 |
| 269 | 0.3 | 2.0 | 0.05 | $1 \times 10^{-4}$ | 0.1 | 0.8 | — | — | 4.3 | 9.3 | 25 | 30 |
| 270 | 0.3 | 2.0 | 0.05 | $1 \times 10^{-4}$ | 0.1 | 1 | — | — | 5.6 | 9.2 | 24 | 30 |
| 271 | 0.3 | 2.0 | 0.05 | $1 \times 10^{-4}$ | 0.1 | 2 | — | — | 7.4 | 8.9 | 21 | 20 |
| 272 | 0.3 | 2.0 | 0.05 | $1 \times 10^{-4}$ | 0.1 | 5 | — | — | 9.2 | 8.9 | 18 | 10 |
| 273 | 0.3 | 2.0 | 0.05 | $1 \times 10^{-4}$ | 0.1 | — | 0.001 | — | 2.1 | 9.0 | 25 | 30 |
| 274 | 0.3 | 2.0 | 0.05 | $1 \times 10^{-4}$ | 0.1 | — | 0.01 | — | 2.6 | 9.0 | 24 | 30 |
| 275 | 0.3 | 2.0 | 0.05 | $1 \times 10^{-4}$ | 0.1 | — | 0.05 | — | 2.9 | 8.8 | 25 | 30 |
| 276 | 0.3 | 2.0 | 0.05 | $1 \times 10^{-4}$ | 0.1 | — | 0.1 | — | 3.0 | 9.4 | 26 | 30 |
| 277 | 0.3 | 2.0 | 0.05 | $1 \times 10^{-4}$ | 0.1 | — | 0.3 | — | 3.3 | 9.2 | 26 | 30 |
| 278 | 0.3 | 2.0 | 0.05 | $1 \times 10^{-4}$ | 0.1 | — | 0.5 | — | 3.6 | 8.9 | 25 | 30 |
| 279 | 0.3 | 2.0 | 0.05 | $1 \times 10^{-4}$ | 0.1 | — | 0.8 | — | 4.6 | 9.0 | 24 | 30 |
| 280 | 0.3 | 2.0 | 0.05 | $1 \times 10^{-4}$ | 0.1 | — | 1 | — | 5.1 | 9.1 | 23 | 30 |
| 281 | 0.3 | 2.0 | 0.05 | $1 \times 10^{-4}$ | 0.1 | — | 2 | — | 7.9 | 8.8 | 21 | 15 |
| 282 | 0.3 | 2.0 | 0.05 | $1 \times 10^{-4}$ | 0.1 | — | — | 0.001 | 2.0 | 8.9 | 25 | 30 |
| 283 | 0.3 | 2.0 | 0.05 | $1 \times 10^{-4}$ | 0.1 | — | — | 0.01 | 2.5 | 9.1 | 24 | 30 |
| 284 | 0.3 | 2.0 | 0.05 | $1 \times 10^{-4}$ | 0.1 | — | — | 0.05 | 3.3 | 9.1 | 24 | 30 |
| 285 | 0.3 | 2.0 | 0.05 | $1 \times 10^{-4}$ | 0.1 | — | — | 0.1 | 3.4 | 9.0 | 23 | 30 |
| 286 | 0.3 | 2.0 | 0.05 | $1 \times 10^{-4}$ | 0.1 | — | — | 0.3 | 3.5 | 9.3 | 25 | 30 |
| 287 | 0.3 | 2.0 | 0.05 | $1 \times 10^{-4}$ | 0.1 | — | — | 0.5 | 3.5 | 8.8 | 24 | 30 |
| 288 | 0.3 | 2.0 | 0.05 | $1 \times 10^{-4}$ | 0.1 | — | — | 0.8 | 4.6 | 8.9 | 23 | 30 |
| 289 | 0.3 | 2.0 | 0.05 | $1 \times 10^{-4}$ | 0.1 | — | — | 1 | 5.2 | 8.8 | 25 | 30 |
| 290 | 0.3 | 2.0 | 0.05 | $1 \times 10^{-4}$ | 0.1 | — | — | 2 | 7.8 | 9.0 | 20 | 15 |
| 291 | 0.3 | 2.0 | 0.05 | 0.1 | 0.005 | — | — | — | 2.3 | 9.1 | 25 | 30 |
| 292 | 0.3 | 2.0 | 0.05 | 0.1 | 0.01 | — | — | — | 2.4 | 8.8 | 25 | 30 |
| 293 | 0.3 | 2.0 | 0.05 | 0.1 | 0.1 | — | — | — | 2.9 | 9.0 | 24 | 30 |
| 294 | 0.3 | 2.0 | 0.05 | 0.1 | 0.5 | — | — | — | 4.1 | 9.2 | 25 | 30 |
| 295 | 0.3 | 2.0 | 0.05 | 0.1 | 1 | — | — | — | 5.4 | 9.0 | 23 | 30 |
| 296 | 0.3 | 2.0 | 0.05 | 0.1 | 2 | — | — | — | 7.9 | 9.1 | 20 | 30 |

Sample No. 261 corresponds to sample No. 6 shown in Table 1. Sample No. 262 corresponds to a conventionally known multilayer varistor.

As can be seen from Table 14, it was understood that when at least one of Ca, Sr, and Ba was further contained, the IR could be improved. In this case, as can be seen from sample Nos. 263 to 270, 273 to 280, 282 to 289, and 291 to 295, it was understood that when the total content was 1.0 atom percent or less, the initial IR could be effectively improved. When the total content of Ca, Sr, and Ba was more than 1.0 atom percent (sample Nos. 271, 272, 281, 290, and 296), although the initial IR was further improved, the ESD resistance was decreased.

Example 8

Except that the contents of Pr, Co, K, Al, and Zr were fixed constant, and that at least one of LaNd, Sm, Eu, Gd, Tb, Dy, Ho, Er, Tm, Yb, and Y was contained, multilayer varistors were formed from sintered bodies having sub-component compositions of sample Nos. 297 to 360 shown in Table 15 in the same manner as that in Example 1, and the evaluation was performed. In this example, sample No. 297 corresponds to sample No. 6 shown in Table 1.

In addition, except that the contents of Pr, Co, K, Al, and Zr were fixed constant, and that Ca and La, Sr and La, Ba and La, or Ca, Sr, Ba, and La were contained so that the contents shown in Table 16 were obtained, multilayer varistors of sample Nos. 361 to 384 were formed in the same manner as that in Example 1, and the evaluation was performed. The results are shown in Table 15-1 and 15-2.

TABLE 15-1

| SAMPLE NO. | ADDITION ELEMENT (atom %) | | | | | | | INITIAL IR | VARISTOR VOLTAGE | SURGE RESISTANCE | ESD RESISTANCE |
|---|---|---|---|---|---|---|---|---|---|---|---|
| | Pr | Co | K | Al | Zr | TYPE | CONTENT | | | | |
| 297 | 0.3 | 2.0 | 0.05 | $1 \times 10^{-4}$ | 0.1 | — | — | 1.8 MΩ | 8.8 V | 25 A | 30 kV |
| 298 | 0.3 | 2.0 | 0.05 | $1 \times 10^{-4}$ | 0.1 | La | 0.005 | 2 MΩ | 8.9 V | 27 A | 30 kV |
| 299 | 0.3 | 2.0 | 0.05 | $1 \times 10^{-4}$ | 0.1 | La | 0.01 | 2.2 MΩ | 9.0 V | 31 A | 30 kV |
| 300 | 0.3 | 2.0 | 0.05 | $1 \times 10^{-4}$ | 0.1 | La | 0.05 | 2.2 MΩ | 9.1 V | 35 A | 30 kV |
| 301 | 0.3 | 2.0 | 0.05 | $1 \times 10^{-4}$ | 0.1 | La | 0.1 | 2.3 MΩ | 9.2 V | 32 A | 30 kV |
| 302 | 0.3 | 2.0 | 0.05 | $1 \times 10^{-4}$ | 0.1 | La | 0.5 | 2.1 MΩ | 8.8 V | 31 A | 30 kV |
| 303 | 0.3 | 2.0 | 0.05 | $1 \times 10^{-4}$ | 0.1 | La | 1 | 2.3 MΩ | 8.9 V | 27 A | 30 kV |
| 304 | 0.3 | 2.0 | 0.05 | $1 \times 10^{-4}$ | 0.1 | La | 2 | 3.0 MΩ | 9.1 V | 21 A | 20 kV |
| 305 | 0.3 | 2.0 | 0.05 | $1 \times 10^{-4}$ | 0.1 | La | 5 | 3.2 MΩ | 9.0 V | 19 A | 10 kV |
| 306 | 0.3 | 2.0 | 0.05 | $1 \times 10^{-4}$ | 0.1 | Nd | 0.005 | 2.2 MΩ | 9.0 V | 27 A | 30 kV |
| 307 | 0.3 | 2.0 | 0.05 | $1 \times 10^{-4}$ | 0.1 | Nd | 0.01 | 2.5 MΩ | 8.9 V | 32 A | 30 kV |
| 308 | 0.3 | 2.0 | 0.05 | $1 \times 10^{-4}$ | 0.1 | Nd | 0.5 | 2.6 MΩ | 8.8 V | 33 A | 30 kV |
| 309 | 0.3 | 2.0 | 0.05 | $1 \times 10^{-4}$ | 0.1 | Nd | 1 | 2.6 MΩ | 9.3 V | 27 A | 30 kV |
| 310 | 0.3 | 2.0 | 0.05 | $1 \times 10^{-4}$ | 0.1 | Nd | 5 | 3.1 MΩ | 9.2 V | 21 A | 20 kV |
| 311 | 0.3 | 2.0 | 0.05 | $1 \times 10^{-4}$ | 0.1 | Sm | 0.005 | 1.9 MΩ | 9.2 V | 25 A | 30 kV |
| 312 | 0.3 | 2.0 | 0.05 | $1 \times 10^{-4}$ | 0.1 | Sm | 0.01 | 2.1 MΩ | 8.9 V | 33 A | 30 kV |
| 313 | 0.3 | 2.0 | 0.05 | $1 \times 10^{-4}$ | 0.1 | Sm | 0.5 | 3.0 MΩ | 9.1 V | 34 A | 30 kV |
| 314 | 0.3 | 2.0 | 0.05 | $1 \times 10^{-4}$ | 0.1 | Sm | 1 | 3.1 MΩ | 9.1 V | 27 A | 30 kV |
| 315 | 0.3 | 2.0 | 0.05 | $1 \times 10^{-4}$ | 0.1 | Sm | 5 | 3.4 MΩ | 9.1 V | 22 A | 15 kV |
| 316 | 0.3 | 2.0 | 0.05 | $1 \times 10^{-4}$ | 0.1 | Eu | 0.005 | 2.3 MΩ | 9.1 V | 26 A | 30 kV |
| 317 | 0.3 | 2.0 | 0.05 | $1 \times 10^{-4}$ | 0.1 | Eu | 0.01 | 2.9 MΩ | 9.0 V | 33 A | 30 kV |
| 318 | 0.3 | 2.0 | 0.05 | $1 \times 10^{-4}$ | 0.1 | Eu | 0.5 | 3.0 MΩ | 8.9 V | 31 A | 30 kV |
| 319 | 0.3 | 2.0 | 0.05 | $1 \times 10^{-4}$ | 0.1 | Eu | 1 | 3.5 MΩ | 9.2 V | 29 A | 30 kV |
| 320 | 0.3 | 2.0 | 0.05 | $1 \times 10^{-4}$ | 0.1 | Eu | 5 | 3.9 MΩ | 9.3 V | 23 A | 20 kV |
| 321 | 0.3 | 2.0 | 0.05 | $1 \times 10^{-4}$ | 0.1 | Gd | 0.005 | 2.0 MΩ | 9.0 V | 28 A | 30 kV |
| 322 | 0.3 | 2.0 | 0.05 | $1 \times 10^{-4}$ | 0.1 | Gd | 0.01 | 2.2 MΩ | 9.1 V | 31 A | 30 kV |
| 323 | 0.3 | 2.0 | 0.05 | $1 \times 10^{-4}$ | 0.1 | Gd | 0.5 | 2.3 MΩ | 9.0 V | 33 A | 30 kV |
| 324 | 0.3 | 2.0 | 0.05 | $1 \times 10^{-4}$ | 0.1 | Gd | 1 | 2.6 MΩ | 9.3 V | 28 A | 30 kV |
| 325 | 0.3 | 2.0 | 0.05 | $1 \times 10^{-4}$ | 0.1 | Gd | 5 | 2.9 MΩ | 9.1 V | 23 A | 15 kV |
| 326 | 0.3 | 2.0 | 0.05 | $1 \times 10^{-4}$ | 0.1 | Tb | 0.005 | 2.5 MΩ | 8.8 V | 27 A | 30 kV |
| 327 | 0.3 | 2.0 | 0.05 | $1 \times 10^{-4}$ | 0.1 | Tb | 0.01 | 2.9 MΩ | 8.7 V | 33 A | 30 kV |
| 328 | 0.3 | 2.0 | 0.05 | $1 \times 10^{-4}$ | 0.1 | Tb | 0.5 | 3.3 MΩ | 8.8 V | 35 A | 30 kV |
| 329 | 0.3 | 2.0 | 0.05 | $1 \times 10^{-4}$ | 0.1 | Tb | 1 | 3.5 MΩ | 9.3 V | 28 A | 30 kV |
| 330 | 0.3 | 2.0 | 0.05 | $1 \times 10^{-4}$ | 0.1 | Tb | 5 | 3.9 MΩ | 9.0 V | 21 A | 15 kV |

TABLE 15-2

| SAMPLE NO. | ADDITION ELEMENT (atom %) | | | | | | | INITIAL IR | VARISTOR VOLTAGE | SURGE RESISTANCE | ESD RESISTANCE |
|---|---|---|---|---|---|---|---|---|---|---|---|
| | Pr | Co | K | Al | Zr | TYPE | CONTENT | | | | |
| 331 | 0.3 | 2.0 | 0.05 | $1 \times 10^{-4}$ | 0.1 | Dy | 0.005 | 2.5 MΩ | 9.2 V | 27 A | 30 kV |
| 332 | 0.3 | 2.0 | 0.05 | $1 \times 10^{-4}$ | 0.1 | Dy | 0.01 | 2.3 MΩ | 9.1 V | 33 A | 30 kV |
| 333 | 0.3 | 2.0 | 0.05 | $1 \times 10^{-4}$ | 0.1 | Dy | 0.5 | 2.9 MΩ | 9.0 V | 34 A | 30 kV |
| 334 | 0.3 | 2.0 | 0.05 | $1 \times 10^{-4}$ | 0.1 | Dy | 1 | 3.2 MΩ | 8.8 V | 29 A | 30 kV |
| 335 | 0.3 | 2.0 | 0.05 | $1 \times 10^{-4}$ | 0.1 | Dy | 5 | 3.2 MΩ | 8.8 V | 24 A | 20 kV |
| 336 | 0.3 | 2.0 | 0.05 | $1 \times 10^{-4}$ | 0.1 | Ho | 0.005 | 2.3 MΩ | 8.9 V | 26 A | 30 kV |
| 337 | 0.3 | 2.0 | 0.05 | $1 \times 10^{-4}$ | 0.1 | Ho | 0.01 | 2.4 MΩ | 9.0 V | 30 A | 30 kV |
| 338 | 0.3 | 2.0 | 0.05 | $1 \times 10^{-4}$ | 0.1 | Ho | 0.5 | 2.9 MΩ | 8.8 V | 31 A | 30 kV |
| 339 | 0.3 | 2.0 | 0.05 | $1 \times 10^{-4}$ | 0.1 | Ho | 1 | 3.0 MΩ | 8.9 V | 28 A | 30 kV |
| 340 | 0.3 | 2.0 | 0.05 | $1 \times 10^{-4}$ | 0.1 | Ho | 5 | 3.3 MΩ | 9.0 V | 23 A | 20 kV |
| 341 | 0.3 | 2.0 | 0.05 | $1 \times 10^{-4}$ | 0.1 | Er | 0.005 | 2.1 MΩ | 9.1 V | 27 A | 30 kV |
| 342 | 0.3 | 2.0 | 0.05 | $1 \times 10^{-4}$ | 0.1 | Er | 0.01 | 2.8 MΩ | 8.8 V | 33 A | 30 kV |
| 343 | 0.3 | 2.0 | 0.05 | $1 \times 10^{-4}$ | 0.1 | Er | 0.5 | 2.7 MΩ | 9.1 V | 35 A | 30 kV |
| 344 | 0.3 | 2.0 | 0.05 | $1 \times 10^{-4}$ | 0.1 | Er | 1 | 3.1 MΩ | 9.2 V | 28 A | 30 kV |
| 345 | 0.3 | 2.0 | 0.05 | $1 \times 10^{-4}$ | 0.1 | Er | 5 | 3.0 MΩ | 9.0 V | 21 A | 20 kV |
| 346 | 0.3 | 2.0 | 0.05 | $1 \times 10^{-4}$ | 0.1 | Tm | 0.005 | 2.1 MΩ | 8.8 V | 27 A | 30 kV |
| 347 | 0.3 | 2.0 | 0.05 | $1 \times 10^{-4}$ | 0.1 | Tm | 0.01 | 2.4 MΩ | 8.9 V | 33 A | 30 kV |
| 348 | 0.3 | 2.0 | 0.05 | $1 \times 10^{-4}$ | 0.1 | Tm | 0.5 | 2.9 MΩ | 9.1 V | 34 A | 30 kV |
| 349 | 0.3 | 2.0 | 0.05 | $1 \times 10^{-4}$ | 0.1 | Tm | 1 | 3.0 MΩ | 9.0 V | 29 A | 30 kV |
| 350 | 0.3 | 2.0 | 0.05 | $1 \times 10^{-4}$ | 0.1 | Tm | 5 | 3.3 MΩ | 9.1 V | 23 A | 20 kV |
| 351 | 0.3 | 2.0 | 0.05 | $1 \times 10^{-4}$ | 0.1 | Yb | 0.005 | 1.9 MΩ | 9.0 V | 28 A | 30 kV |
| 352 | 0.3 | 2.0 | 0.05 | $1 \times 10^{-4}$ | 0.1 | Yb | 0.01 | 2.2 MΩ | 8.8 V | 33 A | 30 kV |
| 353 | 0.3 | 2.0 | 0.05 | $1 \times 10^{-4}$ | 0.1 | Yb | 0.5 | 2.5 MΩ | 8.9 V | 35 A | 30 kV |
| 354 | 0.3 | 2.0 | 0.05 | $1 \times 10^{-4}$ | 0.1 | Yb | 1 | 2.6 MΩ | 9.2 V | 29 A | 30 kV |
| 355 | 0.3 | 2.0 | 0.05 | $1 \times 10^{-4}$ | 0.1 | Yb | 5 | 2.8 MΩ | 9.1 V | 23 A | 20 kV |
| 356 | 0.3 | 2.0 | 0.05 | $1 \times 10^{-4}$ | 0.1 | Y | 0.005 | 1.9 MΩ | 9.0 V | 29 A | 30 kV |

TABLE 15-2-continued

| SAMPLE NO. | ADDITION ELEMENT (atom %) | | | | | | | INITIAL IR | VARISTOR VOLTAGE | SURGE RESISTANCE | ESD RESISTANCE |
|---|---|---|---|---|---|---|---|---|---|---|---|
| | Pr | Co | K | Al | Zr | TYPE | CONTENT | | | | |
| 357 | 0.3 | 2.0 | 0.05 | $1 \times 10^{-4}$ | 0.1 | Y | 0.01 | 2.1 MΩ | 8.9 V | 35 A | 30 kV |
| 358 | 0.3 | 2.0 | 0.05 | $1 \times 10^{-4}$ | 0.1 | Y | 0.5  | 2.3 MΩ | 8.8 V | 36 A | 30 kV |
| 359 | 0.3 | 2.0 | 0.05 | $1 \times 10^{-4}$ | 0.1 | Y | 1    | 2.4 MΩ | 8.7 V | 29 A | 30 kV |
| 360 | 0.3 | 2.0 | 0.05 | $1 \times 10^{-4}$ | 0.1 | Y | 5    | 2.8 MΩ | 8.9 V | 24 A | 20 kV |

TABLE 16

| SAMPLE NO. | ADDITION ELEMENT (atom %) | | | | | | | | | INITIAL IR (MΩ) | VARISTOR VOLTAGE (V) | SURGE RESISTANCE (A) | ESD RESISTANCE (kV) |
|---|---|---|---|---|---|---|---|---|---|---|---|---|---|
| | Pr | Co | K | Al | Zr | Ca | Sr | Ba | La | | | | |
| 361 | 0.3 | 2.0 | 0.05 | $1 \times 10^{-4}$ | 0.1 | 0.001 | — | — | 0.005 | 2.4 | 8.8 | 27 | 30 |
| 362 | 0.3 | 2.0 | 0.05 | $1 \times 10^{-4}$ | 0.1 | 0.01  | — | — | 0.01  | 2.7 | 8.9 | 31 | 30 |
| 363 | 0.3 | 2.0 | 0.05 | $1 \times 10^{-4}$ | 0.1 | 0.1   | — | — | 0.05  | 3.2 | 9.0 | 35 | 30 |
| 364 | 0.3 | 2.0 | 0.05 | $1 \times 10^{-4}$ | 0.1 | 0.5   | — | — | 0.1   | 3.9 | 9.1 | 32 | 30 |
| 365 | 0.3 | 2.0 | 0.05 | $1 \times 10^{-4}$ | 0.1 | 0.8   | — | — | 0.5   | 4.4 | 9.2 | 31 | 30 |
| 366 | 0.3 | 2.0 | 0.05 | $1 \times 10^{-4}$ | 0.1 | 1     | — | — | 1     | 5.6 | 8.8 | 27 | 30 |
| 367 | 0.3 | 2.0 | 0.05 | $1 \times 10^{-4}$ | 0.1 | —     | 0.001 | — | 0.005 | 2.3 | 9.2 | 26 | 30 |
| 368 | 0.3 | 2.0 | 0.05 | $1 \times 10^{-4}$ | 0.1 | —     | 0.01  | — | 0.01  | 2.7 | 8.9 | 32 | 30 |
| 369 | 0.3 | 2.0 | 0.05 | $1 \times 10^{-4}$ | 0.1 | —     | 0.1   | — | 0.05  | 3.4 | 8.9 | 34 | 30 |
| 370 | 0.3 | 2.0 | 0.05 | $1 \times 10^{-4}$ | 0.1 | —     | 0.5   | — | 0.1   | 3.8 | 8.9 | 35 | 30 |
| 371 | 0.3 | 2.0 | 0.05 | $1 \times 10^{-4}$ | 0.1 | —     | 0.8   | — | 0.5   | 4.5 | 9.1 | 35 | 30 |
| 372 | 0.3 | 2.0 | 0.05 | $1 \times 10^{-4}$ | 0.1 | —     | 1     | — | 1     | 5.4 | 8.9 | 29 | 30 |
| 373 | 0.3 | 2.0 | 0.05 | $1 \times 10^{-4}$ | 0.1 | —     | — | 0.001 | 0.005 | 2.1 | 9.0 | 28 | 30 |
| 374 | 0.3 | 2.0 | 0.05 | $1 \times 10^{-4}$ | 0.1 | —     | — | 0.01  | 0.01  | 2.5 | 9.0 | 32 | 30 |
| 375 | 0.3 | 2.0 | 0.05 | $1 \times 10^{-4}$ | 0.1 | —     | — | 0.1   | 0.05  | 3.2 | 9.1 | 36 | 30 |
| 376 | 0.3 | 2.0 | 0.05 | $1 \times 10^{-4}$ | 0.1 | —     | — | 0.5   | 0.1   | 4.2 | 9.2 | 35 | 30 |
| 377 | 0.3 | 2.0 | 0.05 | $1 \times 10^{-4}$ | 0.1 | —     | — | 0.8   | 0.5   | 5.0 | 8.9 | 34 | 30 |
| 378 | 0.3 | 2.0 | 0.05 | $1 \times 10^{-4}$ | 0.1 | —     | — | 1     | 1     | 5.4 | 9.0 | 26 | 30 |
| 379 | 0.3 | 2.0 | 0.05 | $1 \times 10^{-4}$ | 0.1 | 0.0005 | 0.0003 | 0.002 | 0.005 | 2.5 | 9.1 | 27 | 30 |
| 380 | 0.3 | 2.0 | 0.05 | $1 \times 10^{-4}$ | 0.1 | 0.005  | 0.002  | 0.003 | 0.01  | 2.8 | 8.8 | 30 | 30 |
| 381 | 0.3 | 2.0 | 0.05 | $1 \times 10^{-4}$ | 0.1 | 0.01   | 0.05   | 0.04  | 0.05  | 3.1 | 8.9 | 36 | 30 |
| 382 | 0.3 | 2.0 | 0.05 | $1 \times 10^{-4}$ | 0.1 | 0.2    | 0.2    | 0.1   | 0.1   | 4.4 | 8.9 | 35 | 30 |
| 383 | 0.3 | 2.0 | 0.05 | $1 \times 10^{-4}$ | 0.1 | 0.4    | 0.4    | 0.2   | 0.5   | 4.5 | 9.2 | 33 | 30 |
| 384 | 0.3 | 2.0 | 0.05 | $1 \times 10^{-4}$ | 0.1 | 0.4    | 0.4    | 0.2   | 1     | 4.8 | 9.0 | 29 | 30 |

As can be seen from Table 15, according to sample Nos. 298 to 303, 306 to 309, 311 to 314, 316 to 319, 321 to 324, 326 to 329, 331 to 334, 336 to 339, 341 to 344, 346 to 349, 351 to 354, and 356 to 359, which contained at least one of La, Nd, Sm, Eu, Gd, Tb, Dy, Ho, Er, Tm, Yb, and Y, the surge resistance was further improved, and according to sample Nos. 299 to 302, 307, 308, 312, 313, 317, 318, 322, 323, 327, 328, 332, 333, 337, 338, 342, 343, 347, 348, 352, 353, 357, and 358, which contained at least one of La, Nd, Sm, Eu, Gd, Tb, Dy, Ho, Er, Tm, Yb, and Y at a content in the range of from 0.01 to 0.5 atom percent, it was understood that the surge resistance could be even further improved. However, according to sample Nos. 304, 305, 310, 315, 320, 325, 330, 335, 340, 345, 350, 355, and 360, which contained at least one of La, Nd, Sm, Eu, Gd, Tb, Dy, Ho, Er, Tm, Yb, and Y at a content of more than 1.0 atom percent, it was understood that the surge resistance and the ESD resistance were adversely decreased.

As can be seen from Table 16, according to sample Nos. 361 to 366 which used a sintered body further containing Ca and La, it was understood that the IR and the surge resistance were even further improved. In addition, as can be seen from Table 16, it was understood that the content of Ca was preferably set to 1.0 atom percent or less, and that the content of La was preferably set to 1.0 atom percent or less.

As can be seen from Table 16, according to sample No. 367 to 372 further containing Sr and La, it was understood that the IR and the surge resistance were even further improved. In addition, in particular, according to sample No. 368 to 370 in which La was contained at a content in the range of from 0.01 to 0.5 atom percent, it was understood the surge resistance could be even further improved.

As can be seen from the results according to sample Nos. 373 to 378, when a sintered body further containing Ba and La was used, it was understood that the IR and the surge resistance could be even further improved. In particular, according to sample No. 374 to 376 in which the La content was in the range of from 0.01 to 0.5 atom percent, it was understood that the surge resistance was even further improved.

According to sample Nos. 379 to 384, since Ca, Sr, Ba, and La were contained as shown in Table 16, it was understood that the IR and the surge resistance could be even further improved. In addition, in particular, according to sample Nos. 381 to 383 in which the La content was in the range of from 0.01 to 0.5 atom percent, it was understood the surge resistance could be even further improved.

As described above, since the ceramic composition for a varistor, according to the examples, comprises zinc oxide as a primary component and sub-components including at least one of Pr, Co, K, Na, and Li, at least one of Al, Ga, and In, and Zr at specific contents described above, a varistor can be provided which has a small leak current and a high ESD resistance and which is preferably driven at a low voltage.

Industrial Applicability

As has thus been described, the ceramic composition for a varistor, according to the present invention, is used for manufacturing a varistor preferably used for an electrostatic protection element or a noise filter, and in particular, is preferably used for manufacturing a multilayer varistor composed of a plurality of varistor layers laminated to each other.

The invention claimed is:

1. A ceramic composition utilizable to form a varistor, comprising: zinc oxide as a primary component; and sub-components comprising praseodymium at a content of 0.05 to 3.0 atomic percent of the total, cobalt at a content of 0.5 to 10 atom percent of the total, at least one of potassium, sodium and lithium at a total content of 0.005 to 0.5 atom percent of the total, at least one of aluminum, gallium and indium at a total content of $2\times10^{-5}$ to 0.5 atom percent of the total, and zirconium at a content of 0.1 to 5.0 atom percent of the total.

2. The ceramic composition according to claim 1, further comprising at least one of calcium, strontium and barium at a total content of 1.0 atom percent or less of the total.

3. The ceramic composition for a varistor, according to claim 2, further comprising at least one member selected from the group consisting of lanthanum, neodymium, samarium, europium, gadolinium, terbium, dysprosium, holmium, erbium, thulium, ytterbium and yttrium at a total content of 1.0 atom percent or less of the total.

4. The ceramic composition according to claim 3, wherein said at least one member is La.

5. The ceramic composition according to claim 1, wherein the zirconium is contained at a content of from 0.1 to 3 atom percent of the total.

6. The ceramic composition according to claim 1, further comprising at least one member selected from the group consisting of lanthanum, neodymium, samarium, europium, gadolinium, terbium, dysprosium, holmium, erbium, thulium, ytterbium and yttrium at a total content of about 1 atom percent or less of the total.

7. The ceramic composition according to claim 6, wherein said at least one member is at a total content of 0.01 to 0.5 atom percent of the total.

8. The ceramic composition according to claim 6, wherein said at least one member is La.

9. The ceramic composition according to claim 1, containing cobalt and aluminum at an atomic ratio of 20 to 3,000.

10. The ceramic composition according to claim 9, wherein said at least one of potassium, sodium and lithium is potassium, and the zirconium is contained at a content of from 0.1 to 3.0 atom percent of the total.

11. The ceramic composition according to claim 1, wherein said at least one of potassium, sodium and lithium is potassium.

12. A varistor comprising a sintered body of sintered ceramic composition and a plurality of terminal electrodes on exterior surfaces of the sintered body, the ceramic composition sintered comprising zinc oxide as a primary component and sub-components which comprise praseodymium at a content of 0.05 to 3.0 atomic percent of the total, cobalt at a content of 0.5 to 10 atom percent of the total, at least one of potassium, sodium and lithium at a total content of 0.005 to 0.5 atom percent of the total, at least one of aluminum, gallium and indium at a total content of $2\times10^{-5}$ to 0.5 atom percent of the total, and zirconium at a content of 0.1 to 5.0 atom percent of the total.

13. The varistor according to claim 12, wherein the ceramic composition sintered contains (a) at least one of calcium, strontium and barium at a total content of 1 atom percent or less of the total, (b) at least one member selected from the group consisting of lanthanum, neodymium, samarium, europium, gadolinium, terbium, dysprosium, holmium, erbium, thulium, ytterbium and yttrium at a total content of 1 atom percent or less of the total, or (c) both (a) and (b).

14. The varistor according to claim 12, wherein the zirconium is contained at a content of from 0.1 to 3 atom percent of the total.

15. The varistor according to claim 12, wherein the ceramic composition sintered contains containing cobalt and aluminum at an atomic ratio of 20 to 3,000, said at least one of potassium, sodium and lithium is potassium, and the zirconium is contained at a content of from 0.1 to 3 atom percent of the total.

16. The varistor according to claim 15, further comprising a plurality of electrodes in the interior of the sintered body such that each adjacent pair of electrodes in said plurality of internal electrodes is disposed with a layer of sintered body provided therebetween and each of said internal electrodes is electrically connected to an exterior electrode.

17. The varistor according to claim 14, further comprising a plurality of electrodes in the interior of the sintered body such that each adjacent pair of electrodes in said plurality of internal electrodes is disposed with a layer of sintered body provided therebetween and each of said internal electrodes is electrically connected to an exterior electrode.

18. The varistor according to claim 13, further comprising a plurality of electrodes in the interior of the sintered body such that each adjacent pair of electrodes in said plurality of internal electrodes is disposed with a layer of sintered body provided therebetween and each of said internal electrodes is electrically connected to an exterior electrode.

19. The varistor according to claim 12, further comprising a plurality of electrodes in the interior of the sintered body such that each adjacent pair of electrodes in said plurality of internal electrodes is disposed with a layer of sintered body provided therebetween and each of said internal electrodes is electrically connected to an exterior electrode.

* * * * *